(12) United States Patent
Blumenau et al.

(10) Patent No.: US 7,756,842 B2
(45) Date of Patent: Jul. 13, 2010

(54) SYSTEMS AND METHODS FOR TRACKING REPLICATION OF DIGITAL ASSETS

(75) Inventors: Steven Blumenau, Holliston, MA (US); Matthew Barnes, Somerville, MA (US)

(73) Assignee: Iron Mountain Incorporated, Boston, MA (US)

( * ) Notice: Subject to any disclaimer, the term of this patent is extended or adjusted under 35 U.S.C. 154(b) by 313 days.

(21) Appl. No.: 11/283,253

(22) Filed: Nov. 17, 2005

(65) Prior Publication Data

US 2006/0106885 A1 May 18, 2006

Related U.S. Application Data

(60) Provisional application No. 60/628,806, filed on Nov. 17, 2004.

(51) Int. Cl.
G06F 7/00 (2006.01)
G06F 17/00 (2006.01)

(52) U.S. Cl. .................. 707/694; 707/781; 707/913; 725/97

(58) Field of Classification Search .......... 705/52, 705/58, 57, 64; 718/100; 709/206, 224; 713/176, 156; 715/256; 707/6, 101; 726/28; 235/462.01, 462.07; 725/97
See application file for complete search history.

(56) References Cited

U.S. PATENT DOCUMENTS

| | | | |
|---|---|---|---|
| 6,674,923 B1 | 1/2004 | Shih et al. | |
| 6,889,211 B1 * | 5/2005 | Yoshiura et al. | 705/58 |
| 6,974,081 B1 * | 12/2005 | Kanevsky et al. | 235/462.01 |
| 6,993,535 B2 | 1/2006 | Bolle et al. | |
| 7,124,441 B1 | 10/2006 | Brown | |
| 7,155,466 B2 | 12/2006 | Rodriguez et al. | |
| 7,181,468 B2 | 2/2007 | Spring et al. | |
| 7,216,289 B2 * | 5/2007 | Kagle et al. | 715/256 |
| 7,249,383 B1 * | 7/2007 | McCully et al. | 726/28 |
| 7,275,063 B2 | 9/2007 | Horn | |
| 7,287,053 B2 | 10/2007 | Bodin | |
| 7,304,984 B2 | 12/2007 | Butler et al. | |
| 7,356,679 B1 | 4/2008 | Le et al. | |
| 7,366,907 B1 | 4/2008 | Ezaki | |
| 7,386,530 B2 | 6/2008 | Kiessig et al. | |
| 7,395,436 B1 | 7/2008 | Nemovicher | |

(Continued)

FOREIGN PATENT DOCUMENTS

WO    WO 2004055702 A1 * 7/2004

(Continued)

OTHER PUBLICATIONS

Amit Sawarkar, "Digital Asset Management", Digital Media Solutions Center, XP-002198865, May 22, 2001.

(Continued)

Primary Examiner—John E Breene
Assistant Examiner—Giovanna Colan
(74) Attorney, Agent, or Firm—BainwoodHuang

(57) ABSTRACT

Systems and methods for managing digital assets in a distributed computing environment are described. Meta-data for the digital assets is stored separately from the digital assets. Meta-data for some of the digital assets is copied and stored at a central location. Meta-data for the digital assets is generated by clients of the system.

19 Claims, 11 Drawing Sheets

U.S. PATENT DOCUMENTS

| | | |
|---|---|---|
| 7,404,202 B2 | 7/2008 | Hamilton et al. |
| 7,444,323 B2 | 10/2008 | Martinez et al. |
| 7,467,198 B2 | 12/2008 | Goodman et al. |
| 2002/0026435 A1 | 2/2002 | Wyss et al. |
| 2002/0032626 A1 | 3/2002 | DeWolf et al. |
| 2002/0033844 A1 | 3/2002 | Levy et al. |
| 2002/0049829 A1 | 4/2002 | Miyawaki |
| 2002/0065780 A1 | 5/2002 | Barritz et al. |
| 2002/0077985 A1 | 6/2002 | Kobata et al. |
| 2002/0078255 A1 | 6/2002 | Narayan |
| 2002/0133557 A1 | 9/2002 | Winarski |
| 2002/0138358 A1 | 9/2002 | Scheer |
| 2002/0143775 A1 | 10/2002 | Wilkinson et al. |
| 2002/0143819 A1 | 10/2002 | Han et al. |
| 2002/0157023 A1 | 10/2002 | Calahan et al. |
| 2002/0178229 A1 | 11/2002 | Sinha et al. |
| 2002/0178271 A1 | 11/2002 | Graham et al. |
| 2002/0188841 A1 | 12/2002 | Jones et al. |
| 2002/0194480 A1* | 12/2002 | Nagao ................... 713/176 |
| 2003/0023695 A1* | 1/2003 | Kobata et al. ............ 709/206 |
| 2003/0023851 A1 | 1/2003 | Peha |
| 2003/0110126 A1 | 6/2003 | Dunkeld et al. |
| 2003/0115150 A1* | 6/2003 | Hamilton et al. ............ 705/64 |
| 2003/0126215 A1 | 7/2003 | Udell et al. |
| 2003/0130993 A1 | 7/2003 | Mendelevitch et al. |
| 2003/0140034 A1 | 7/2003 | Probst et al. |
| 2003/0231207 A1 | 12/2003 | Huang |
| 2004/0015408 A1 | 1/2004 | Rauen et al. |
| 2004/0039754 A1 | 2/2004 | Harple, Jr. |
| 2004/0091111 A1 | 5/2004 | Levy et al. |
| 2004/0122653 A1 | 6/2004 | Mau et al. |
| 2004/0128555 A1 | 7/2004 | Saitoh et al. |
| 2004/0133923 A1 | 7/2004 | Watson et al. |
| 2004/0172394 A1* | 9/2004 | Smolsky ................... 707/6 |
| 2004/0187111 A1* | 9/2004 | Eakin ..................... 718/100 |
| 2004/0201689 A1 | 10/2004 | Quintana et al. |
| 2004/0220926 A1 | 11/2004 | Lamkin et al. |
| 2005/0004875 A1* | 1/2005 | Kontio et al. ............. 705/52 |
| 2005/0038707 A1 | 2/2005 | Roever et al. |
| 2005/0060537 A1* | 3/2005 | Stamos et al. ............ 713/156 |
| 2005/0065624 A1* | 3/2005 | Ben-Yaacov et al. .......... 700/94 |
| 2005/0125355 A1* | 6/2005 | Fein ..................... 705/57 |
| 2005/0131945 A1 | 6/2005 | Muller et al. |
| 2005/0198158 A1 | 9/2005 | Fabre et al. |
| 2005/0223242 A1 | 10/2005 | Nath |
| 2005/0234909 A1 | 10/2005 | Bade et al. |
| 2005/0246686 A1 | 11/2005 | Seshadri et al. |
| 2006/0015637 A1 | 1/2006 | Chung |
| 2006/0020984 A1* | 1/2006 | Ban et al. .................. 725/97 |
| 2006/0106834 A1 | 5/2006 | Blumenau et al. |
| 2007/0110044 A1 | 5/2007 | Barnes et al. |
| 2007/0112784 A1 | 5/2007 | Blumenau et al. |
| 2007/0113288 A1 | 5/2007 | Blumenau |
| 2007/0113289 A1 | 5/2007 | Blumenau |
| 2007/0113293 A1 | 5/2007 | Blumenau |
| 2007/0130127 A1 | 6/2007 | Passmore et al. |
| 2007/0130218 A1 | 6/2007 | Blumenau |
| 2007/0266032 A1 | 11/2007 | Blumenau |
| 2008/0256354 A1 | 10/2008 | Blumenau |

FOREIGN PATENT DOCUMENTS

| | | |
|---|---|---|
| WO | 2006055758 A2 | 5/2006 |
| WO | 2006055758 A3 | 5/2006 |
| WO | 2008055218 A2 | 5/2008 |

OTHER PUBLICATIONS

International Search Report for PCT/US2005/041773 mailed May 29, 2006.

Written Opinion of the International Searching Authority for PCT/US2005/041773 mailed May 29, 2006.

Applicant directs the Examiner's attention to the following related U.S. Appl. Nos. 11/283,252, 11/283,245, 11/282,788, 11/282,451, 11/282,870, 11/282,465, 11/283,254, 11/282,464, 11/282,463, 11/283,246, filed Nov. 17, 2005.

International Search Report and Written Opinion from PCT/US2007/083195, mailed Jan. 16, 2009.

* cited by examiner

SYSTEMS AND METHODS FOR TRACKING REPLICATION OF DIGITAL ASSETS

FIELD OF THE INVENTION

The invention relates to managing digital assets in a distributed computing environment. More specifically, the invention relates to tracking replication of digital assets.

BACKGROUND OF THE INVENTION

Centralized document management and other centralized applications can ease digital asset management tasks. However, these tools are expensive, difficult to install and configure, and require end-users to change the manner in the way they work and interact with each other. These solutions are also very dependent upon the end-users to self-enforce corporate governance policies with respect to the digital assets that they create.

The centralized file control mechanism used by these present solutions typically requires end-users to use a burdensome check-in/check-out process to obtain files. However, many end-users prefer not to give up control of their digital assets, are unwilling to sacrifice the ability to use their laptops when they are detached from the corporate network, and resist the workflow requirements of centralized systems. This leaves open the potential for many files located on file servers, laptops, desktops, personal digital assistants (PDAs), and other computing devices to remain outside the controls of the digital asset management system.

Additional drawbacks of current centralized document management tools include: the inability to categorize all digital assets on a storage device; the poor quality of existing categorization techniques when used within a structured context; the inability to provide effective automated control over categorization of digital assets as they are created and changed; the inability to request categorization information from the end-user; the inability to selectively record categorization information based on the conceptual value of the assets; and the lack of category maintenance as assets are copied, moved, renamed, deleted and restored.

There is, therefore, a conflict between the benefits of centralized file management and end user behavior; a tension which limits the amount of information that will be captured by a centralized document management system.

SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. Its sole purpose is to present some concepts of the invention in a simplified form as a prelude to the more detailed description presented below.

As a general introduction, the invention includes a computer software system for gathering and recording categorization data when a digital asset (e.g., file, voicemail, instant message log, email, and the like) or a digital asset container (e.g., folder, directory, disk drive, removable storage medium, and the like) is created. The system executes in a pre-emptive multi-tasking environment. In various embodiments, the software system provides the following features: the ability to categorize existing digital assets in a file system; categorizing digital assets upon creation; a structured and adaptable set of terms (i.e., a taxonomy) for categorization; rule-based categorization of digital assets, minimal change or interruption to the end-user while the software system is in use; the ability to gather meta-data about the digital assets from the end-user; categorization meta-data that is independent of the stored digital asset and structured for simple retrieval of the digital asset; segregation of categorization meta-data (e.g., storing only the meta-data for a digital asset is indicated of value); maintaining the meta-data over time; and propagating the meta-data with the digital asset when the digital asset is transmitted, printed, moved, or copied.

In one aspect, the present invention allows the end-user to leave a digital asset in the location it is most productive to the end-user rather than moving everything into a centralized repository. In today's distributed and mobile corporate world, it is important that information reside locally with the end-user to enhance productivity while remaining under control of the corporation. To this end, the present invention provides a means to categorize digital assets at the point of creation with little or no work on the end-user's behalf. The location of digital assets is tracked without requiring the digital asset be stored at a central location.

Once digital assets are categorized, the present invention allows a policy application to the digital assets. One benefit provided by this feature is that corporations can apply policies to digital assets according to a centralized policy. For example, a corporation decides upon a behavior such as privacy for specific human resource digital assets. That policy is then applied to all digital assets of that type, regardless of the form of the digital assets (e.g., files, email, instant message (IM) logs, etc) that are tagged as human resources digital assets.

In order to provide the necessary level of control and management, operations performed on the digital assets can be audited. For example, using the categorization the end-user or administrator can set the level of audit to be performed. In one embodiment, a low level of audit would simply keep track of copies and relationships while a high level of audit would keep track of every operation that took place on the digital asset and for the length of time required to perform the operation.

Other features provided by the present invention include, but are not limited to retention/deletion of digital assets, automatic creation of copies of digital assets, prevention of operations on digital assets, expiration of archived copies of digital assets, storing meta-data separate from the digital asset, prevention of restoration of expired digital assets, searching the digital assets using virtual folders having labels based on the meta-data, copy tracking of digital assets, combining meta-data tags, propagating the meta-data tags with the digital assets, providing an adaptive taxonomy used to create meta-data for the digital assets.

Retention/Deletion: Each type of digital asset has controls on the minimum length of time that the digital asset is stored and possibly the maximum length the digital asset can be stored. This translates to storing digital assets for a given period of time and then either archiving the digital asset or destroying the digital asset. In certain embodiments, the present invention provides this feature.

Automatic Copy: There are a number of reasons to make automatic copies of digital assets. For example, the end-user or administrator could set a policy to make a copy of financial digital assets. Another example would be to make a copy of digital assets from a local storage device to a centralized storage device so the digital assets can be archived (i.e., backed-up). In certain embodiments, the present invention provides such functionality.

Prevention of Operations: In various embodiments, the present invention applies a policy to block certain operations from being performed on a digital asset. For example, specific digital asset can be prevented from being transmitted outside of the company. Another example of a policy is to prevent specific digital assets from being copied to specific devices such as removable media, e.g., USB devices. Policies can also be applied based on the role of the end-user to provide role based access control to certain digital assets.

Expiration of Archived Copies: In certain embodiments, specific expiration policies are applied to digital assets. When copied to the storage medium for archiving, these policies are copied along with the digital assets. Should an attempt to restore the copies from the storage medium, the policies applied to the copies prevent their restoration. In other embodiments, an encryption key that was used to encrypt the copies prior to storage on the medium is destroyed after an assigned expiration date.

Additional features and aspects of the invention are described in greater detail below.

BRIEF DESCRIPTION OF THE DRAWINGS

The advantages of this invention, described above, and further advantages, may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

The present invention provides systems and methods for managing digital assets in a distributed computing environment (DCE). The invention relates generally to the collection, recording and maintenance of meta-data that identifies and categorizes stored digital assets for later location, retrieval and application of business controls. The term meta-data and asset identification tag are used synonymously throughout the specification to refer to the information that is created and used by the present invention to identify and categorize digital assets. Although some of the meta-data created by the present invention corresponds to known meta-data of a file system (e.g., the i-node associated with a file by the Unix operating system or a Master File Table Record used by the WINDOWS operating system, manufactured by Microsoft Corporation of Redmond, Wash.) the meta-data of the present invention supplements and extends the known file system meta-data.

Figure 1:
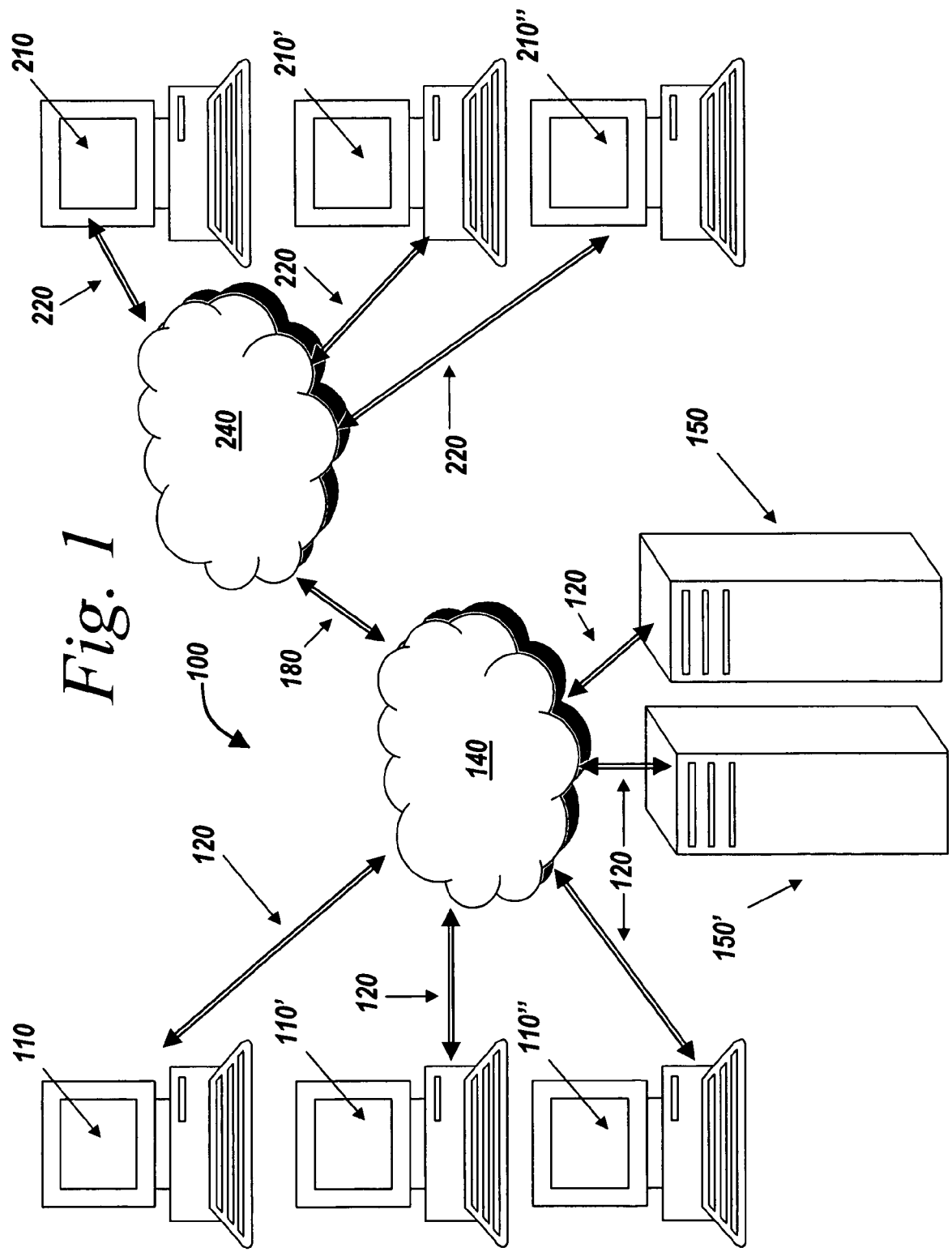
FIG. 1 shows an embodiment of a distributed computing environment (DCE).

With reference to FIG. 1, a distributed computing environment (also referred to as a client/server system) 100 in which principles of the present invention can be practiced includes one or more clients 110, 110', 110" (hereinafter each client or plurality of clients is generally referred to as 110) in communication with one or more servers 150, 150' (hereinafter each server or plurality of servers is generally referred to as 150) via communications network 140 through communications links 120. The communications network 140 can be a local-area network (LAN), a medium-area network (MAN), or a wide area network (WAN) such as the Internet or the World Wide Web. The communication links 120 can be a variety of connections including standard telephone lines, LAN or WAN links (e.g., T1, T3, 56 kb, X.25), broadband connections (e.g., ISDN, Frame Relay, ATM), and wireless connections (e.g., IEEE 802.11). The clients 110 and servers 150 communicate through the network 140 using a variety of communication protocols (e.g., TCP/IP, IPX, SPX, NetBIOS, NetBEUI, and direct asynchronous protocols).

Additionally, the clients 110 can communicate with other clients 210, 210', 210" (hereinafter each other client or plurality of other clients is generally referred to as 210), which can be connected to a second network 240, through a communication link 180 that connects network 140 to the second network 240. The protocols used to communicate through communications link 180 can include any variety of protocols used for long haul or short transmission. For example, TCP/IP, IPX, SPX, NetBIOS, NetBEUI, SONET and SDH protocols.

The client 110 can be any personal computer, Windows-based terminal, Network Computer, wireless device, information appliance, RISC Power PC, X-device, workstation, minicomputer, main frame computer, cellular telephone or other computing device that provides sufficient faculties to execute client software and an operating system. Client software of the invention facilitates the creation of meta-data that identifies, categorizes, and characterizes the digital assets generated and stored by the client. As used herein, digital asset refers to any digital file that can be stored in a storage medium. Examples of digital assets can include, but are not limited to, files, emails, instant messages (IM), audio files, video files, profiles, drivers, programs, and other electronic embodiments of information.

The server 150 can be any type of computing device that is capable of communication with the client 110. For example, the server 150 can be a traditional server computing device, a web server, an application server, a DNS server, or other type of server. Additionally, the server 150 can also be a client 110 (e.g., in an ad-hoc or peer-to-peer (P2P) network arrangement). One purpose of the server 150 is receiving, storing, and managing meta-data associated with the digital assets of the clients 110. The server 150 can also provide a means to modify and update a taxonomy used to categorize and create meta-data for the digital assets, request that the client perform operations on its stored digital assets, and generate reports on the state of the stored meta-data. One example of a server 150 that can be used with the invention is a DELL server classes computer having 1 gigabyte of RAM, dual central processing units, a 250 gigabyte hard drive, and an network interface card. It should be understood that more than one server 150 can be used with the present invention. In such a configuration, functionality can be distributed across the servers 150 or each server 150 can provide a full suite of functionality.

Figure 2:
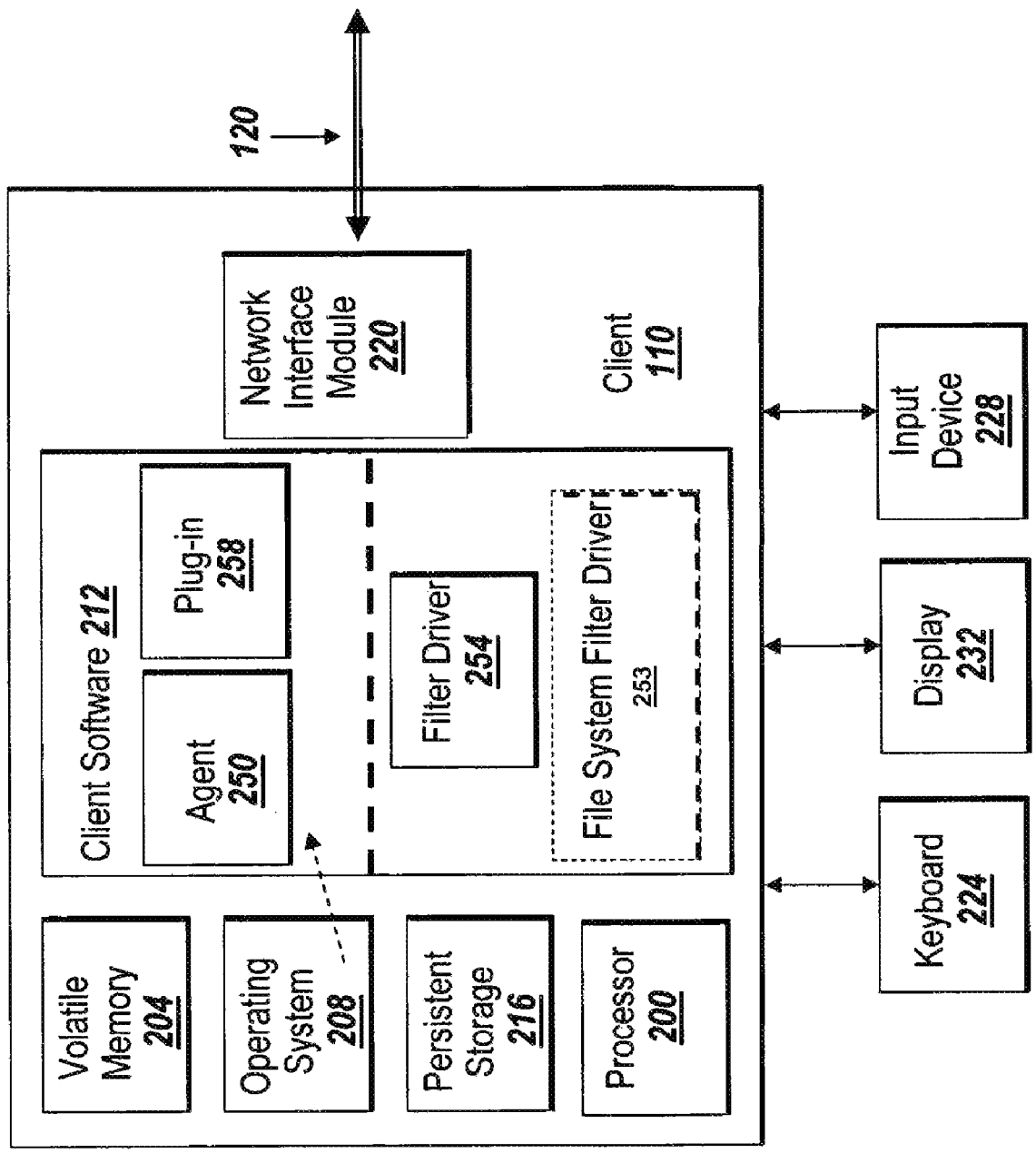
FIG. 2 shows an embodiment of a client of the DCE of FIG. 1 constructed according to principles of the invention.

FIG. 2 depicts a conceptual block diagram of a client 110 of the distributed computing environment 100. Each client 110 typically includes a processor 200, volatile memory 204, an operating system 208, client software 212, a persistent storage memory 216 (e.g., hard drive or external hard drive), a network interface 220 (e.g., a network interface card), a keyboard 224 or virtualized keyboard in the case of a PDA, at least one input device 228 (e.g., a mouse, trackball, space ball, light pen and tablet, touch screen, stylus, and any other input device), and a display 232. The operating system 208 can include, without limitation, WINDOWS 3.x, WINDOWS 95, WINDOWS 98, WINDOWS NT 3.51, WINDOWS NT 4.0, WINDOWS 2000, WINDOWS XP, WINDOWS VISTA, WINDOWS CE, MAC/OS, Java, PALM OS, SYMBIAN OS, LINSPIRE, LINUX, SMARTPHONE OS, and the various forms of UNIX.

The client software 212 is in communication with various components of the client 110 to provide features of the invention. In one embodiment, the client software 212 includes an agent 250, one or more filter drivers 254, and one or more plug-in modules 258. It should be understood that the client software 212 can include some or all of the components shown and described. As a general overview, the client software 212 provides a means to create, edit, maintain, update, revise, modify, and produce meta-data that provides categorization and identification of digital assets. The meta-data is associated with some or all of the digital assets created or stored on the client 110 and is used to provide tracking, locating, searching, and other features and aspects of the invention.

The agent 250 operates in the "user space" of the operating system 208 as do a various plug-in (also referred to as Add-in) modules 258. The agent 250 and plug-ins 258 are in communication with the various filter drivers 254, which operate in the "system space" of the operating system. Although shown in user space, it should be understood that in certain embodiments, the agent 250 can operate in the system space as well. The cooperation of the agent 250, the filter drivers 254, and the plug-in modules 258 provide the end-user of the client 110 with the features and operational characteristics of the invention. These features can be invisible to the end-user (e.g., automatic categorization of digital assets) or require end-user input through a graphical user interface (GUI) (e.g., end-user categorization). For example, when a request to create a folder is executed, the filter driver 254 intercepts the command. The filter driver 254 communicates with the agent 250. In response, the agent 250 displays a graphical dialog and asks the end-user for meta-data information (e.g., categorization information). In one embodiment, the client software 212 also interacts with a file system filter driver 253 that is provided as part of the operating system 208. In another embodiment, the client software 212 replaces the file system filter driver 253 provided by the operating system 208.

During certain modes of operation, the client software 212 intercepts file system commands and performs various functions of the invention in response thereto. For example, prior to adding a new digital asset to the file system of the client 110 the client software 212 intercepts the file system command to create the digital asset and requires the end-user to provide at least a portion of the meta-data (e.g., categorization information) associated with the digital asset. After the client software 212 applies the meta-data, the digital asset is added to the file system of the client 110. Another feature the client software provides is the generation of a digital identifier that is associated with digital asset as part of the meta-data. The categorization information and digital identifier form, in one embodiment, the meta-data that is associated with the digital asset. Another exemplary feature provided by the client software 212 is to perform a search or locate. The end-user of the client issues a search or locate command, the client software 212 intercepts this command and provides a "virtualized" view of the contents of the file system of the client 110. Each of these examples is explained below in more detail.

The associated meta-data for each digital asset may or may not be forwarded to the server 150 via network interface module 220 and communications link 120. Whether the meta-data for the digital asset is transmitted to the server for storage depends on the categorization and rules applied to the digital assets. This provides for granular control of certain digital assets of interest.

Figure 3:
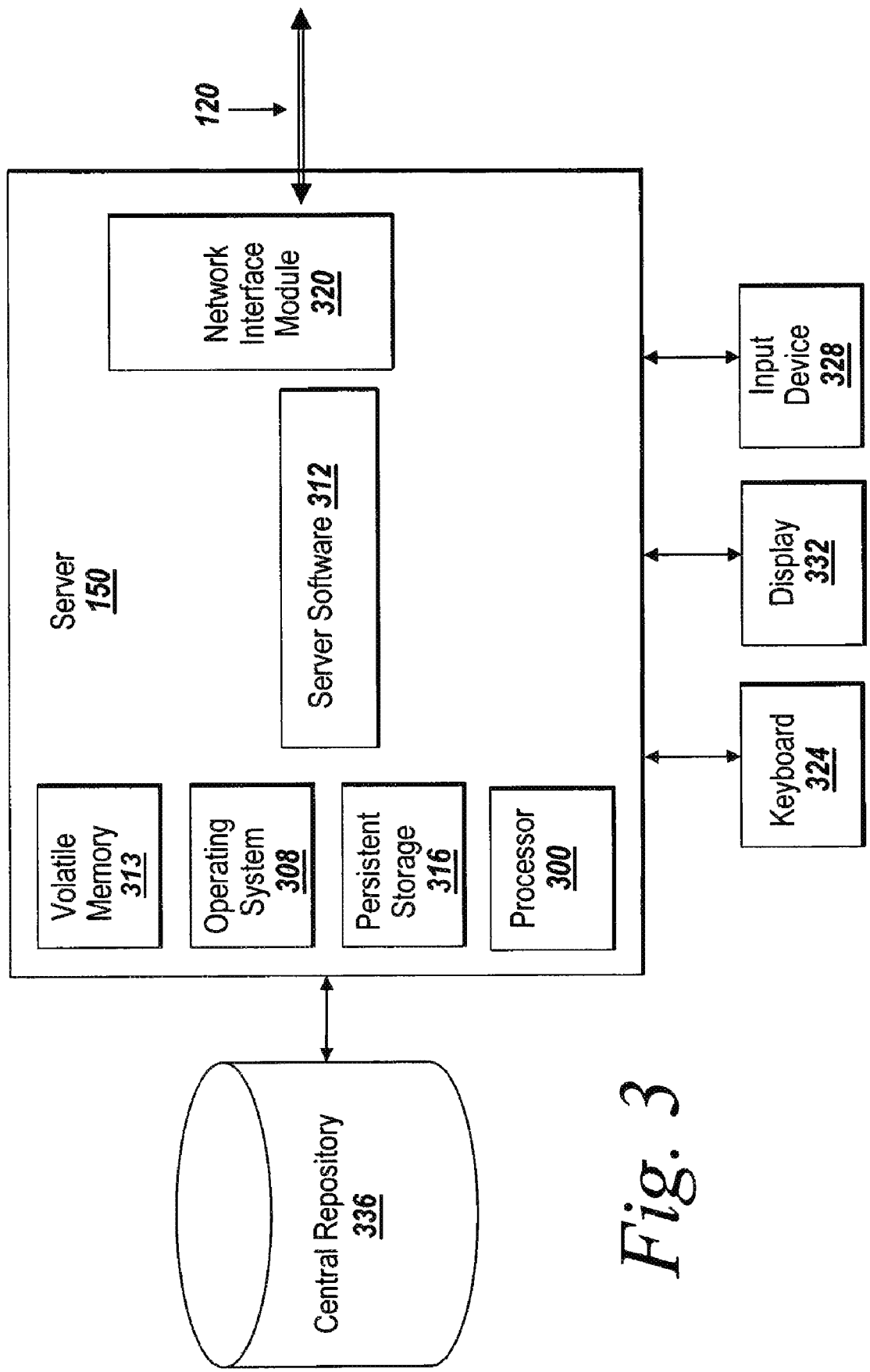
FIG. 3 shows an embodiment of a server of the DCE of FIG. 1 constructed according to principles of the invention.

With reference to FIG. 3, an embodiment of a server 150 for user in the distributed computing environment 100 is described. The server 150 includes a processor 300, a volatile memory 313, an operating system 308, server software 312, persistent storage memory 316, a network interface 320, a keyboard 324, at least one input device 328 (e.g., a mouse, trackball, space ball, bar code reader, scanner, light pen and tablet, stylus, and any other input device), and a display 332. The server operating system can include, but is a not limited to, WINDOWS XP, WINDOWS 2000 SERVER, WINDOWS 2000 ADVANCED SERVER, WINDOWS NT SERVER, WINDOWS NT SERVER ENTERPRISE EDITION, MACINTOSH OS X SERVER, LINUX, UNIX, SOLARIS, VMWARE, and the like.

A central repository 336 (e.g., a database) is in communication with the server 150. Although shown as separate from the server 150, it should be understood that the central repository 336 can be integral with the server 150 or located elsewhere within the distributed computing environment 100. The central repository 336 is configured to store meta-data associated with certain digital assets. In one embodiment, the digital assets and their associated meta-data are stored at the clients 110 and a copy of the associated meta-data is stored at the central repository 336. This provides a "decentralized" digital asset management system, which enables certain features and advantages of the invention. For example, by not storing the digital assets themselves at the central repository 336 the end-users are not required to check-out and check-in the digital assets in order to perform operations on the digital assets.

Additionally, the communication link 120 that connects the client 110 to the server 150 does not need to be maintained thereby tethering the client 110 to the server 150. Said another way, the communication link can be established on an "as-needed" basis. This feature allows the end-user to work "off-line" with the digital assets of interest and upload changes to the meta-data when a connection to the central repository 336 is established. Additionally, changes to the meta-data for a digital asset can be downloaded from central repository 336 when a connection is established. Also, various policies associated with the meta-data of the digital assets can require performance of specific tasks when the client 110 connects to the server 150. it should be understood that when the client 110 connects to the server 150 these tasks are executed.

In certain embodiments, the server software 312 provides a means to perform certain features of the invention. For example, the server software 312 allows an administrator to create and modify an adaptive taxonomy that is used to create categorization information for a digital asset. Also, the server software 312 propagates different meta-data sets for the same digital each to each client 110 having a copy of the digital asset. The clients 110, in turn, perform a union of the different meta-data sets. In other embodiments, the server software 312 cooperates with the client software 212 to enable other features of the invention. For example, an administrator can issue a command using the server software 312 to copy certain digital assets to a central location in an effort to produce documents required in litigation. An example of a function that is performed by the client software 212, but can also be provided by the server software 312 is the ability to perform a union of meta-data for a digital asset and propagate a selected characterization for that digital asset. Each of these features is described in more detail below With reference to FIG. 4, an exemplary adaptive taxonomy 400 of the invention is described. As used herein, taxonomy refers to a hierarchical structure of tags used to provide a method of organizing digital assets. Conceptually, a taxonomy can be thought of as a tree structure having a root node 410, a plurality branches 420 connecting leaf nodes 430. Each leaf node 430 can have further branches 420 that connect the leaf nodes 430 to sub-leaf nodes 440 and so on. As used with reference to the taxonomy 400, the terms node and tag are synonymously.

Each node 430 and sub-node 440 can be applied to a digital asset as a tag that is part of the meta-data for the digital asset. The tag that is used to identify and categorize the digital asset. When used properly, a taxonomy 400 not only helps an organization organize digital assets but the taxonomy also helps identify types of digital assets. Policies can also be associated with each node 430 and sub-node 440 of the taxonomy 400. Applying a node 430 or sub-node 440 as a tag of the taxonomy to a digital asset also associates the policy for that node to the digital asset. Examples of policies can include, but are not limited to, restricting access to a digital asset based on the role and/or identity of the end-user of the client 110, restricting replication actions based on the destination of the copy of the digital asset or the present location of the digital asset, and when the digital asset is removed from the client 110.

Although a taxonomy 400 is a powerful organizational tool, a rigid taxonomy restricts the flexibility of digital asset characterization. To that end, the invention provides a mechanism in which modifications to the taxonomy 400 can be made by the end-users of the clients 110 on an individual level without requiring modifications to the general taxonomy 400. Also, if a change to the general taxonomy 400 is required, the invention provides a mechanism for propagating the changes to the taxonomy 400 to the clients 110.

To accomplish these features, the invention provides the functionality to create an "alias" for a node 430 or sub-node 440 in the taxonomy. As used herein, an alias refers to an alternate name for the same tag in the taxonomy 400. For example, the term "CV" (Curriculum Vitae) is used in many parts of the world to have the same meaning as "resume" is used in the United States. In the taxonomy 400, a tag 440 is labeled "Resume" and has an alias 450 labeled "CV" associated with it. Essentially, the alias 450 points to the associated tag 440 and has the categorization and policy information as the tag 440. As will be described in more detail below, the alias 450 can be a local alias meaning that is available only to a specific client 110 or the alias can be a global alias meaning that the alias is available to all clients.

The invention includes functionality implemented, in one embodiment, by the server software 312 to promote an alias 450 to a tag 440. The promotion does not change how the alias 450 has been used previously. That is, digital assets that were tagged with the alias 450 are still governed by the same categorization and policy information of the alias 450. It should be understood that the transition from an alias to a tag 440 allows for the modification of the policies associated with the alias 450. Further details of the adaptive taxonomy 400 are provided below.

Figure 5:
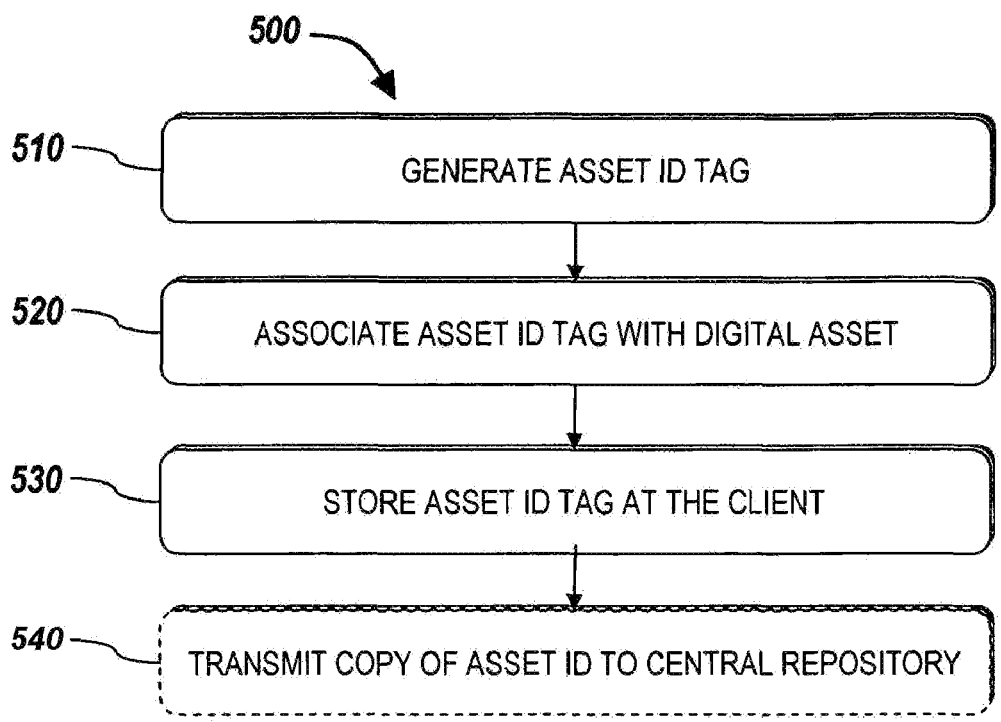
FIG. 5 shows a flow chart of an embodiment of a method of generating meta-data for a digital asset using the client software of FIG. 2 that is operating according to principles of the invention.

With reference to FIG. 5, the method 500 for generating meta-data for a digital asset is shown and described. In one embodiment, a client 110 executing client software 212 generates a digital asset. The client software 212 intercepts a create or a save command for the digital asset and generates (step 510) an asset identification tag. The asset identification tag is the meta-data that is associated with the digital asset. Further, the client software 212 associates (step 520) the asset identification tag with the digital asset. The client stores (step 530) asset identification tag. Optionally, the asset identification tag is transmitted (step 540) to server 150 for storage in the central repository 336.

In one embodiment, generating an asset identification tag (step 510) is performed when the digital asset is stored at the client. In another embodiment, the asset identification tag is created when the end-user begins to create a new digital asset. For example, if the end-user of a client creates a new folder or directory for storing digital assets, the client software 212 examines any rules that related to the creation of the folder to categorize the new folder based first on the device on which the folder is being created, next based on the application creating the folder, and lastly the end-user creating the folder. However, if required, the end-user can be prompted to provide categorization information via an end-user interface. The categorization data is saved and the folder is created within the file system of the device. It should be understood that once a categorization data is applied to a digital asset, the categorization may be changed at a later time, if the associated rules allow. This allows for recategorization of certain digital assets while preventing recategorization of other digital assets. The terms rule and policy are used interchangeably throughout the specification.

In various embodiments, application rules define the set of categorized digital assets (e.g., taxonomy tags) that can be stored with a directory or file when that directory or file is created by an application. Application rules consider the name and context of the digital asset (binary name, binary versions, process name, window titles, and the link) and the name of the directory being created. From this data a set of taxonomy tags are determined and returned as the list of is tags for this digital asset.

Device rules define the set of taxonomy tags that can be applied to a directory or file when that directory or file is created by or stored on a particular device. Rules can be defined for device classes (e.g., local fixed device, network device, removable devices), individual storage devices or input devices. Similarly, end-user rules define the set of taxonomy tags that can be associated with a directory or file when that directory or file is created or changed by the end-user. User rules can consider the end-user's name, the end-user's role, the end-user's location or any other data that can be retrieved from a local or directory based end-user configuration.

By applying rules and categorizations to folders, directories, end-users, and devices, automatic and inheritance based categorization of digital assets is achieved. For example, if a word document is stored in a specific directory, the client software 212 applies the taxonomy tag indicated by the rules and categorization of the directory that stores the word document. Further, if a one or more uncategorized digital assets are moved into a categorized directory those digital asset inherent the categorization of the directory. Such a feature allows for the categorization of digital assets existing on the client 110 prior to the installation of the client software 212.

The following example is designed to illustrate one embodiment of categorizing a digital asset. The example should not be read to limit the scope the invention. Assume that an end-user John Smith who works the finance department creates an Excel file in the "\\finance\john\budget" folder of his home directory that was categorized using the taxonomy tags 430 and 440. The client software 212 creates meta-data that contains various categorization information based on John's identity such as: data created, author, department, etc. The client software 212 can also add meta-data resulting from the rules associated with the "budget" folder (or its parent folder Finance) such as confidential, marked for compliance, do not delete, do not email, and the like. The level of meta-data granularity can be further augmented with input from John using the graphical user interface if desired by John or required by the rules.

Figure 6:
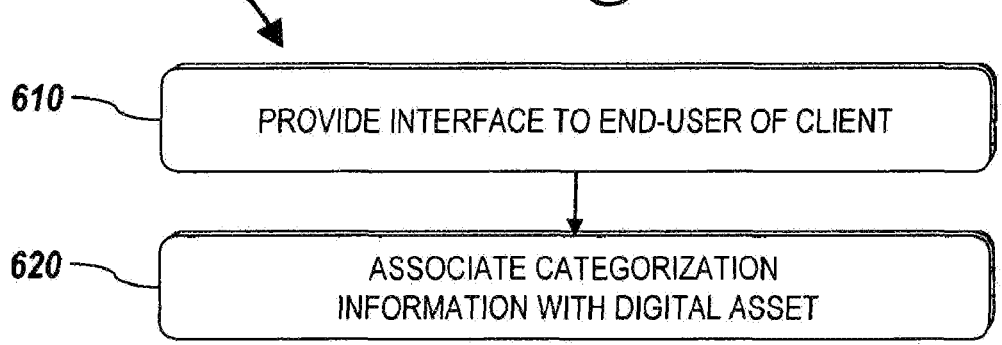
FIG. 6 shows an embodiment of a method of providing meta-data using a graphical user interface according to principles of the invention.

A method 600 of providing meta-data information using the graphical user interface is shown and described with reference to FIG. 6. The client software 212 provides (step 610) the end-user of the client 110 with a graphical display having one or more dialog boxes, lists, or radio buttons. The end-user manipulates the graphical user interface to provide meta-data that is associated (step 620) with the digital asset. Manipulation can include, but is not limited to, selecting a taxonomy tag 430 to apply to the digital asset and the like.

Figure 7:
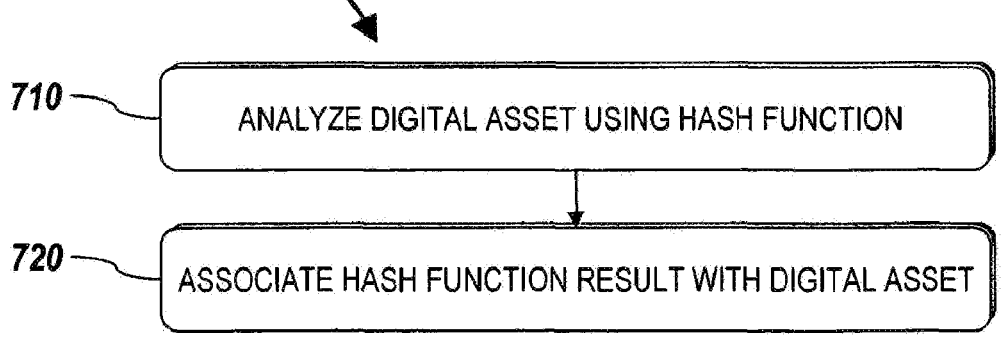
FIG. 7 shows an embodiment of a method of generating a digital identifier for a digital asset according to principles of the invention.

In addition to generating categorization information as part of the meta-data for a digital asset, the client software 212 can generate a digital identifier for each digital asset. One embodiment of a method 700 for generating such a digital identifier is shown and described with reference to FIG. 7. For example, during a save operation the client software 212 analyzes (step 710) the contents of the digital asset using a hash function. In one embodiment, the client software 212 analyzes the text of the digital asset. In other embodiment, additional or other elements of the digital asset are analyzed. For example, the categorization information can also be included in the analysis, or in the case of an email or instant message the sender and recipient of the email or instant message. Examples of hash function that can be used by the client software 212 include but are not limited to MD5 (IETF RFC1321) and SHA1 (IETF RFC3174).

Also, the meta-data can include a list of keywords that are a part of the digital asset. One method of generating the list of keywords for the digital asset is to analyze the digital asset and record words of importance. It should be understood that certain words will not be recognized as keywords. For examples, articles such "a", "an", and "the", or pronouns, will not be recorded as keywords. Various known techniques can be used to generate the list of keywords for the digital asset.

The combination of the digital identifier, keywords, and the categorization information described above, or respective combinations of portions of each create the asset identification tag (i.e., meta-data) for the digital asset. As previously stated, the asset identification tag is associated (step 520) with the digital asset. Association can include creating a "hidden" file that stores the meta-data that is permanently linked to the digital asset. As used herein, permanently linked refers to an association that can not be removed regardless of the transmission, moving, or copying of the digital asset. For example, if a digital asset is emailed to another end-user the associated asset identification tag is emailed as well. The propagation of an asset identification tag will be described in more detail below.

In one embodiment, storing (step 530) the asset identification tag includes storing the asset identification tag in the persistent storage 216 of the client 216. The asset identification tag can be stored in the same shared storage area as the digital asset. Alternatively, the asset identification tag is stored separate from the digital asset. For example, in a different dedicated memory location or another storage device.

In order to determine whether to transmit (step 540) a copy of the asset identification to the server 150, the meta-data of the digital asset is resolved to one of three levels: (1) unmanaged; (2) managed; or (3) records managed. In one embodiment, if the digital asset is resolved to be unmanaged then the asset identification tag is not stored by the client 110 or the server 150. However, if the asset identification tag is resolved to be managed then the asset identification tag is stored locally at the client 110. Finally, if the asset identification tag is resolved as records managed a copy of the asset identification tag is transmitted to the server 150 to notify the server software 312 of the existence of the digital asset. It should be noted that actually the digital asset is not transmitted to the server 150, but instead the digital asset is stored locally at the client 110. Although described as having three levels of resolution, it should be understood that a fewer number or greater number of levels are possible.

The advantages of having a class of "managed" digital assets and a class of "records managed" digital asset is to treat the digital assets in the manner similar to the other assets of a corporations. For example, look at the difference between pencils and computers in a corporation. As with any asset in a corporation, pencils need to be managed. In the case of pencils, the corporation likes to know how many have been ordered and have a general idea of when to order additional pencils. The corporation is typically not concerned with who has a pencil or how many pencils are owned by each person. In contrast to pencils, the corporation wants to know exactly which end-user has each computer and where the computer is located. This analogy translates directly to digital asset. For example, "managed" digital asset can be mapped to pencils and "records managed" digital assets can be mapped to computers. An example of a managed digital asset can be a voice mail from potential new client. An example of a records managed digital asset can be an invention disclosure. By using a leveled approach to digital asset classification, the centralized repository needs only to track a percentage of the digital assets in the distributed computing environment 100 instead of all the digital assets. The digital assets that are not tracked by the centralized repository are tracked by the clients

110. As previously explained, the clients 110 track each of the assets that are stored locally a the client.

One way to determine which digital assets are unmanaged, managed, or records managed is to use the taxonomy tags 430. As previously stated, each digital asset is associated with at least one tag 430 of the taxonomy 400. The taxonomy tag includes policy information (e.g., rules) and a digital asset classification level. Other meta-data entries can also be used to determine whether a digital asset is unmanaged, managed, or records managed. For example, the creation date of the digital asset can be used.

In one embodiment, any digital asset that exists on a client 110 when the client software 212 is installed is automatically categorized as unmanaged. As a result, no meta-data entry on the client is created for these digital assets. The taxonomy 400 can include a tag 430 in it that is labeled "unmanaged" that includes associated policies that are applied to unmanaged digital assets. Typically a small set of policies is used. For example, an expiration date (i.e., expire the asset in 1 year) and also a location control policy that does not allow the digital to be moved, copied, emailed, or otherwise transferred from the current client 110. Similarly, every other tag 430 of the taxonomy 400 can include a rule that creates a meta-data entry giving the digital asset a level of either managed or records managed. For example, if a digital asset is associated with the IP tag 430 the meta-data for the digital asset indicates that the digital asset is classified as managed. Further, if the digital asset is associated with the disclosure sub-tag 440 the meta-data for the digital asset indicates that the digital asset is records managed and a copy of the meta-data is transferred to the server 150 for storage.

In addition to a digital identifier and categorization information, the meta-data for a digital asset can include a list of operations performed on the digital asset by the client 110. This information can be thought of as an audit history and is useful for many things. For example, determining the number of copies of a digital asset that exists, which end-user created the copies, what application created the copies, what is the source of the copy of the digital asset, and which devices stored the copies. The resulting copy not only includes all the contents of the original digital asset, but also the meta-data for the original digital asset, which include the digital identifier of the original file. Said another way, when a copy operation is performed both the contents of the digital asset and its associated meta-data are copied.

It should be understood that the audit information for the same digital asset existing on the different clients 110 can have different contents. If the digital asset is records managed, the audit information for each asset is transferred to the server 150 as part of the meta-data for the asset. The server software 312 performs a union of the audit information, propagates the unionized audit information to the clients 110, and instructions the client software 212 to remove the local copy of the pre-unionized meta-data and replace the pre-unionized meta-data with the unionized meta-data.

Various methods for copying various digital assets are known. Methods for files and email, both of which digital assets, are described below. The most straight forward way to create a copy of a digital asset is to print the digital asset onto paper. This creates a "hard copy" of the digital asset. It is important to track the printing of digital assets for a number of reasons. One reasons is for expiration purposes. It is desirable to know that if a digital asset was printed the day of its expiration that the paper copy was also destroyed. Another reason for tracking copies of digital assets, is to monitor which end-users are accessing and copying which digital assets.

Also, there are many different ways that an electronic copy of a file can be created by the end-user of the client 110. For example, the end-user can execute the "copy" command in windows explorer and then execute a "paste" command in another location. This causes a copy of the content of the file to be created. Even though there are many methods to create a copy of a file, the actual create of the new copy must go through the file system of the client 110. As a result, filter driver 254 is used to identify when a new file for the file system is created.

It is also important to determine when an open file of the file system is written to. For example, an application might open a first file "A" for reading and a second file "B" for writing. The application under the instruction of the end-user copies the contents of the first file A to the second file B. In this example, the second file B was not created it was only updated with the contents of the first file A. In another embodiment, file B is created as a new file and the contents of file A are copied into file B.

Similar to files, there exists a number of methods that can be employed to create a copy of an email. The simplest method is to "copy" an email and then "paste" it using the functionality provided by the email application of the client 110.

Another way to create a copy of an email is to copy the folder or the email application file that stores the email or emails for the email application. Within an email application, an email can be stored within a "folder" of the email application to provide a means to organize the end-user's email. The folders and emails that are displayed to the end-user of the email application are stored in files or directories of the client 110, which may be file system folder. Using MICROSOFT OFFICE OUTLOOK as an example, the application creates and uses the .OST and .PST files for holding the definitions of the folders and the emails shown to the end-user of the application. One method the end-user can use to create a copy of email is to export the email out of the email application. Outlook provides an interface that allows one to export information. Using this feature, one can put the email into a text file, excel spreadsheet or even a .PST file thereby creating a copy of the email.

Another method of creating a copy of email is to simply copy the .OST and/or the .PST file outside of the email application. In this case, the email application is not necessarily executing on the client 110 during the copy operations. This operation is similar to the copying of a file from the file system as described above.

Figure 8:
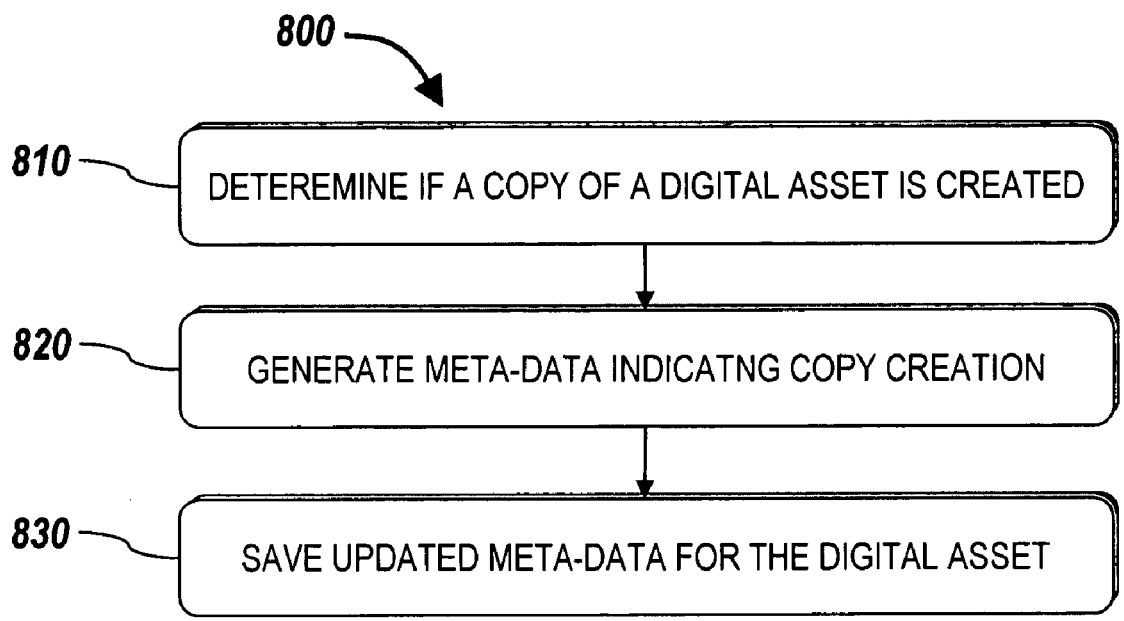
FIG. 8 shows an embodiment of a method of tracking copies of a digital asset according to principles of the present invention.

With respect to FIG. 8, a method 800 of tracking a copy of a digital asset in the distributed computing environment is shown and described. In one embodiment, the method includes determining (step 810) if a copy of the digital asset is created, generating (step 820) a meta-data entry for the original digital asset that indicates a copy was made, and updating (step 830) the stored meta-data for the digital asset.

The determining (step 810) can be accomplished in many ways. In one embodiment, the meta-data of the digital asset being created is compared to a list of know meta-data stored on the client 110 or server 150. In another embodiment, only a portion of the meta-data is used to do the comparison (e.g., the digital identifier).

In another embodiment, the filter driver 254 or the plug-in 258 monitors the action of the applications executing on the client with respect to file I/O. By monitoring an application and its threads, the client software 212 can determine what files are being opened for reading and what files are being open for writing. For example, if an application has opened file A and file B for input and file C for output. File C inherits, as previously described, all the meta-data (e.g., control policies and the like) from both file A and file B and associates them with file C. This method addresses the case of either creating file C as a new file or opening an existing file C for write. Once the first I/O is completed to the output, the meta-data will be updated to the union of file A and file B as described in more detail below. Further, if file C is stored in a folder having an applied taxonomy tag 430, resulting meta-data is the union of file A, file B, and the folder.

The generation (step 820) of meta-data can be accomplished in various ways. For example, when a print (from the perspective of the client software 212 is essentially creating a paper copy of the digital asset) is executed meta-data about the print is added to the meta-data of the printed digital asset. This meta-data can include various combinations of the date and time the digital asset was printed, which end-user printed the digital asset, which digital assets were the source of the printed digital asset, the digital identifier from the source digital assets, and what printer generated the paper copy of the digital asset.

Also, various methods of updating (step 830) the meta-data for the digital asset can be used. For example, in the case of a managed digital asset the meta-data previously stored about the digital asset is refreshed with the copy meta-data. In the case of a records managed digital asset, after the locally stored meta-data is updated the updated meta-data is transmitted to the server 150 for storage.

In certain instances, it is desirable to suspend the creation of meta-data for a digital asset. For example, during the installation of other software applications. Typically, when installing software, a program is executing commands that will cause folders to be created. The end-user could be bombarded with requests for categorization of folders. Because of this, there is a special command that can be executed by the end-user of the client 110 that informs the client software 212 to suspend its operation. After the installation of the software, the client software 212 resumes it's normal operation. Although the operation of the client software 212 can be suspended, the invention monitors what operations are performed while the client software 212 is suspend and records this information to a general audit log for the client 110.

After creating meta-data for each of the digital assets, the meta-data can be used to provide various features of the invention. Some of these features are provided by the client software 212, some are provided by the server software 312, and some are provided by the cooperation of the client software 212 and server software 312.

One feature provided by the client software 212 is the ability to locate a digital asset using the keywords and meta-data associated with the digital asset. As used herein, the term locate is used synonymously with the term search. Because each client 110 stores their digital assets locally, the possible solution set to a locate request is a closed set of digital assets. In essence, when a locate command is executed the full set of possible keywords and meta-data tags that could be used in locate are shown to the end-user of the client 110 as a set of virtualized folders. This removes the requirement from the end-user to input a search term in a search engine if the end-user can not think of a search term. Because most end-users work in a focused area, the number of taxonomy tags and the number of unique keywords stored in the meta-data of the digital assets words are typically limited to the end-users focused work area.

Figure 9:
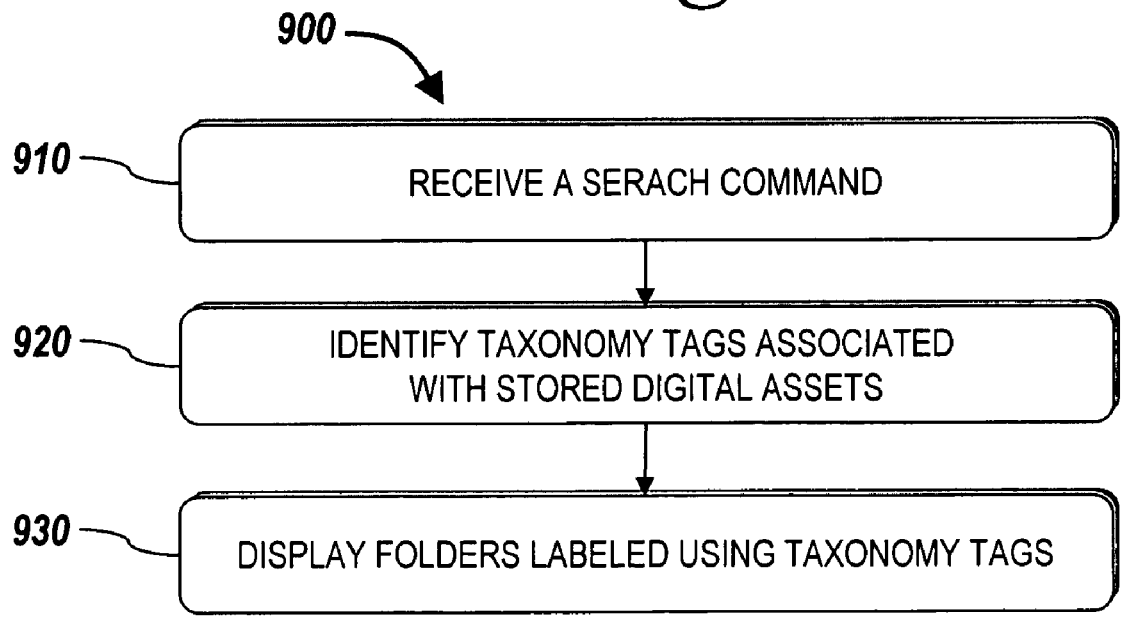
FIG. 9 shows an embodiment of a method of locating a digital asset in the distributed computing environment according to principles of the invention.

With reference to FIG. 9, a method of locating a digital asset in the distributed computing environment 100. In one embodiment, the method includes receiving (step 910) a search command from the end-user of the client, identifying (step 920) the taxonomy tags 430 associated with the digital assets that are stored locally at the client, and displaying (step 930) one or more folders to the end-user of the client 110. The folders include labels that are the identified taxonomy tags 430.

Receiving (step 910) a search or locate command from the end-user of a client 110 can be accomplished in various ways. For example, the end-user can select a hot key (e.g., F12) on a keyword. In another embodiment, the end-user can select a portion of a digital asset and right-click on the selected portion. As a result, a menu is displayed to the end-user that includes a locate menu item. Additionally, the end-user can select a search command from a start menu option.

Various means of identifying (step 920) the taxonomy tags 430 associated with the digital assets of the client 110 are contemplated. In one embodiment, a scan is performed of all the digital assets stored at the client 110 to determine which taxonomy tags 430 are associated with the digital assets. In another embodiment, the end-user can supply a search term to the locate function. As a result, the identified digital assets include the provided term in their associated meta-data. Alternatively, the provided term is used to exclude taxonomy tags 430. In addition to identifying taxonomy tags 430, the client software 212 can identify the keywords in the associated meta-data for the digital assets. Also, a combination of taxonomy tags 430 and keywords can be used.

Figure 10:
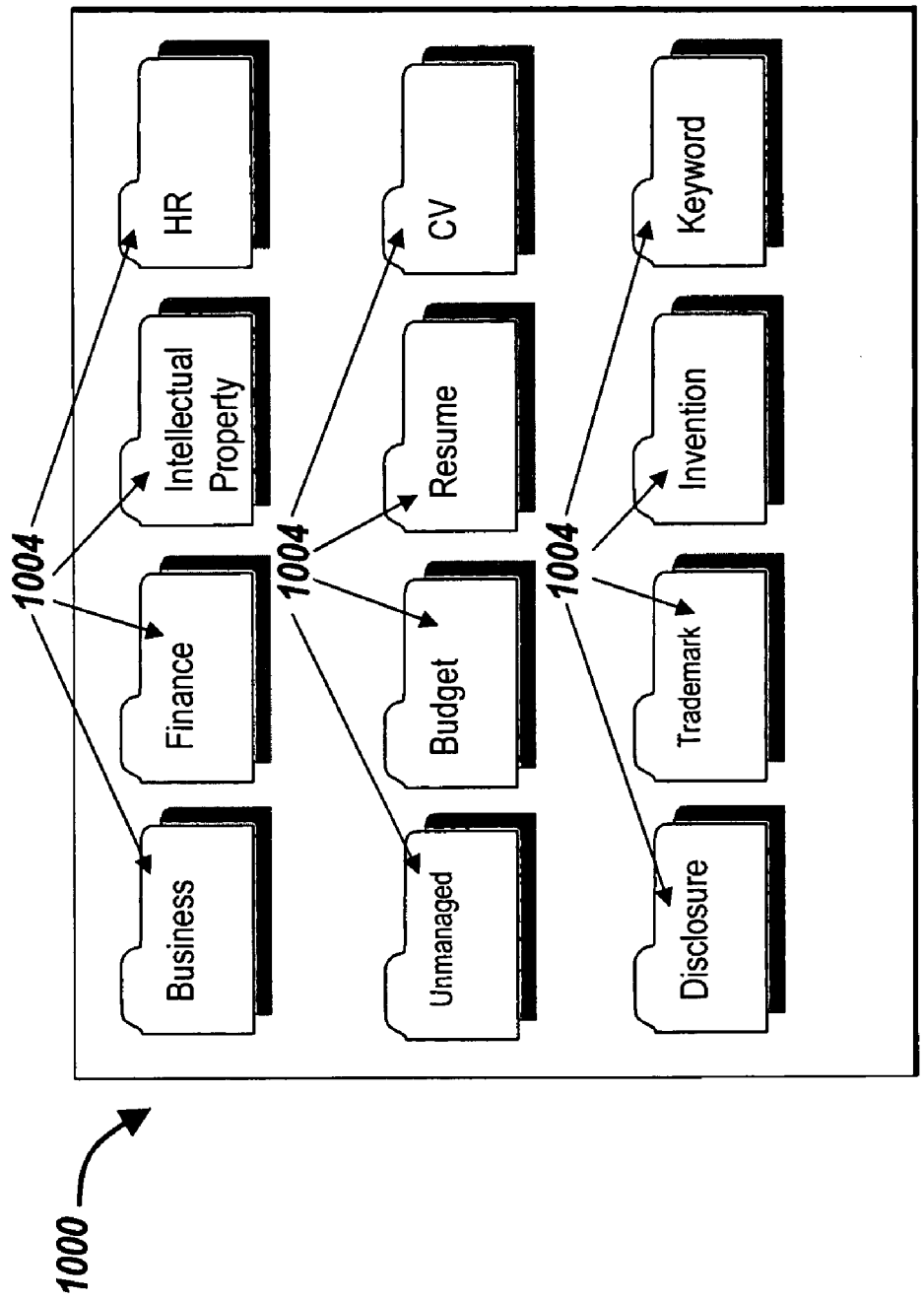
FIG. 10 shows an embodiment of a graphical display of a local result constructed according to principles of the invention.

Once the taxonomy tags 430 and/or keywords are identifies, the client software 212 generates a virtualized file system view of the associated digital assets and displays (step 930) to the end-user. In one embodiment, the familiar graphical "explorer" interface is shown to the end-user. With reference to FIG. 10, the explorer view 1000 depicts one or more folders 1004 and/or files to the end-user. The virtual folders 1004 include a label that is one of the identified taxonomy tags 403 or keywords. The virtual folders 1004 are not the actual file system folders. Creation of the virtual folders is accomplished by the client software 212.

Selecting one of the virtual folders 1004 results in another display of another set of virtual folders. In essence, the system provides a means to "drill down" into meta-data of the digital assets to locate a desired digital asset. By selecting a displayed virtual folder, the client software 212 is in essence performing another search using only the set of digital assets selected from the first search.

Another feature enabled by the meta-data and client software 212 of the present invention is the ability to control and maintain a document expiration policy. By using the associated expiration date that is present in the meta-data for the digital asset, different sets of digital assets can be exposed to an archive system and recorded to separate mediums. For example, all digital assets and only the digital assets having an expiration date in the range of a given week are exposed to the archive system. At the end of that indicated week, the archive tape can be destroyed, thereby destroying the backed-up copies of the digital assets.

Figure 11:
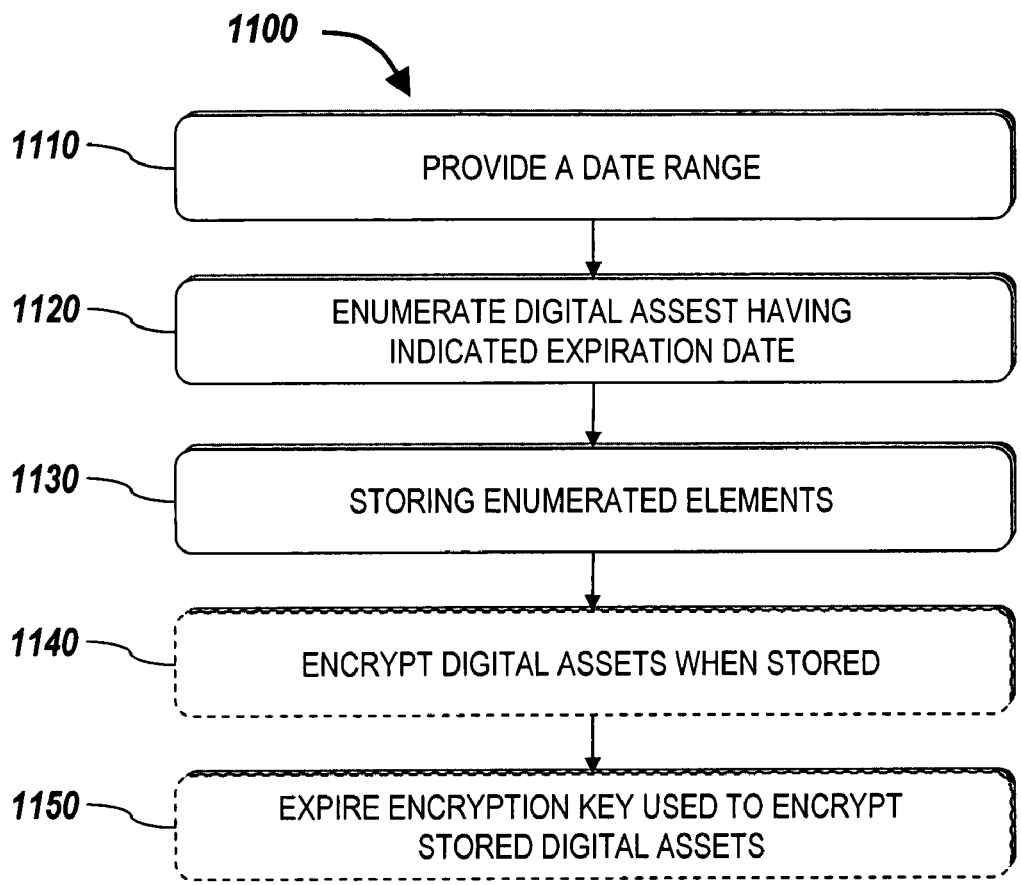
FIG. 11 shows an embodiment of a method of expiring a digital asset according to principles of the invention.

One embodiment of a method 1100 of expiring stored digital assets is shown and described with reference to FIG. 11. The method includes providing (step 1110) a date range using the client software 212, enumerating (step 1120) the digital assets that have an expiration date within the provide range as file system elements, and storing (step 1130) the enumerate assets on a storage medium.

The end-user provides (step 1100) a date range to the client software 212 using a graphical user interface or a command line entry. In another embodiment, the client 110 includes one or more archive scripts that are executed automatically. The scripts include date ranges used to expose specific digital assets to the archive system. Although described as storing the digital assets having the associated date range, it should be understood that the provided data range can indicate digital assets that are not be exposed. An indicator or flag (e.g., an exclamation point) can be used to indicate the described "not" function. Also combinations of both types of date ranges can be used to generate the desired set of digital assets. In addition, the meta-data associated with the digital assets can be used to define the set of digital assets that are exposed for archiving.

Using the provided data range, the digital assets are separated using a virtual file system. In one embodiment, the filter driver 254 creates a virtual file system enumerating (step 1120) those digital assets having an expiration date within the provided date range. Conceptually, the virtual file system acts as a mask over the actual file system of the client. The mask exposes only those digital assets fulfilling the indicated criteria to the archive system.

The exposed digital assets are copied (step 1130) to a storage medium. The storage medium can be a tape, disk, or other suitable storage medium. In one embodiment, the digital assets that are copied to the storage medium are encrypted prior to being copied to the storage medium. In another embodiment, when an expiration date is assigned to the meta-data of the digital asset the digital asset is encrypted (step 1140) when the digital asset is stored in the file system of the client 110. Digital assets having similar expiration dates can each be encrypted with the same encryption key, which can also be stored on the storage medium or separate from the storage medium. The encryption key is assigned an expiration date. After the expiration of that date, the encryption key is destroyed (step 1150). In another embodiment, a separate encryption key is used to encrypt each digital asset.

There are many methods that can be used encrypted the digital assets. For example, an application can encrypt the digital assets. Alternatively, each client can have an encrypted file system such as the Microsoft Encrypted File System. In another embodiment, the filter driver 254 or plug-in 258 can perform the encryption Another feature enabled by the meta-data and client software 212 of the present invention and in some embodiments the server software 312 is the prevention of the restoration of a previously expired digital asset. In one embodiment, once a digital asset has been expired the actual digital asset is removed from the client 110. However, the meta-data remains at the client 110 and in the case of a record managed digital asset at the server 150. The meta-data can include an entry that the digital asset has been previously expired.

Figure 12:
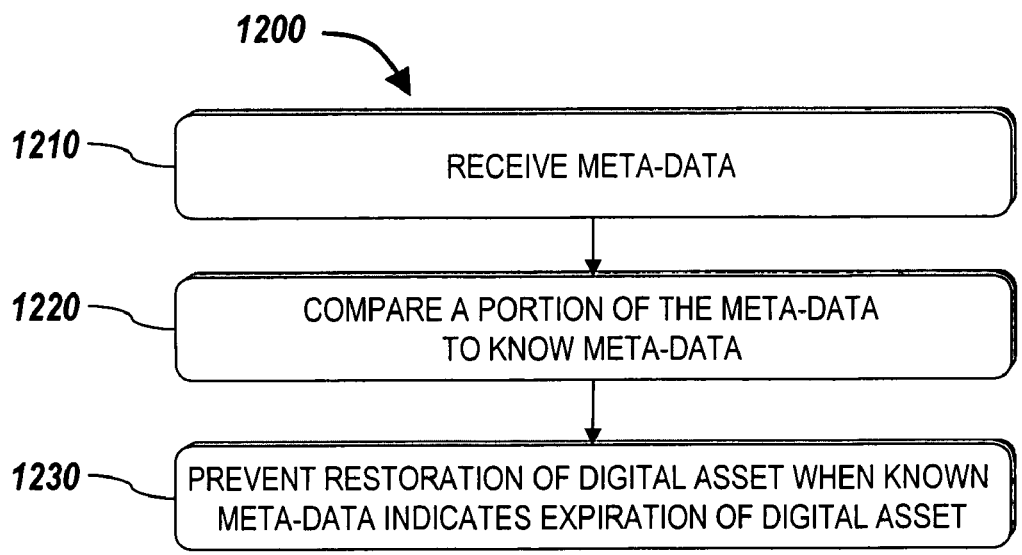
FIG. 12 shows an embodiment of a method of preventing the restoration of an expired digital asset according to an embodiment of the invention.

With reference to FIG. 12, a method 1200 for prevention of restoration of a digital asset is shown and described. In one embodiment, the method includes receiving (step 1210) meta-data associated with a digital asset that was previously created by a client 110, comparing (step 1220) the received meta-data with the stored meta-data on the client 110 and/or the server 150, and preventing (step 1230) the restoration of the digital asset when the received meta-data matches stored meta-data for the digital asset that indicates the digital asset was previously expired.

As previously explained, the client 110 and the server 150 need not be in constant communication because the digital assets are not stored at the server 150, and further a full copy of the meta-data is stored at the client 110. When a digital asset is restored to a client 110 that did not create the digital asset and thus does not have a meta-data entry to compare the restored asset to, the client 110 establishes a connection to the server 150. Once the connection is established, the client 110 transmits the meta-data to the server 150 where it is compared (step 1220) against the meta-stored stored at the server 150.

In one embodiment, the comparing step (1220) includes comparing the entire meta-data contents with the list of known meta-data. In another embodiment, a portion of the meta-data is compared to the list of known meta-data. The portion of the meta-data can include, but is not limited to, the digital identifier or a taxonomy tag. During the comparison process, the client 110 can disconnect from the server 150 or maintain the communication link 120 with the server 150.

When the server 150 finds a match between the restored digital asset meta-data and previously expired digital asset meta-data, the server 150 issues a command to prevent (step 1230) the restoration of the digital asset to the client 110. In one embodiment, the command includes instructions to remove the restore digital asset. In another embodiment, the command includes instruction to not allow the digital asset to be copied to the file system of the client 110.

Another function provided by the client software 212 of the present invention is the ability to control access to digital assets using the associated meta-data of the digital assets. Using the meta-data that is associated with each digital asset, role based, user based, and a combination of role based and user based access is provided.

Figure 13:
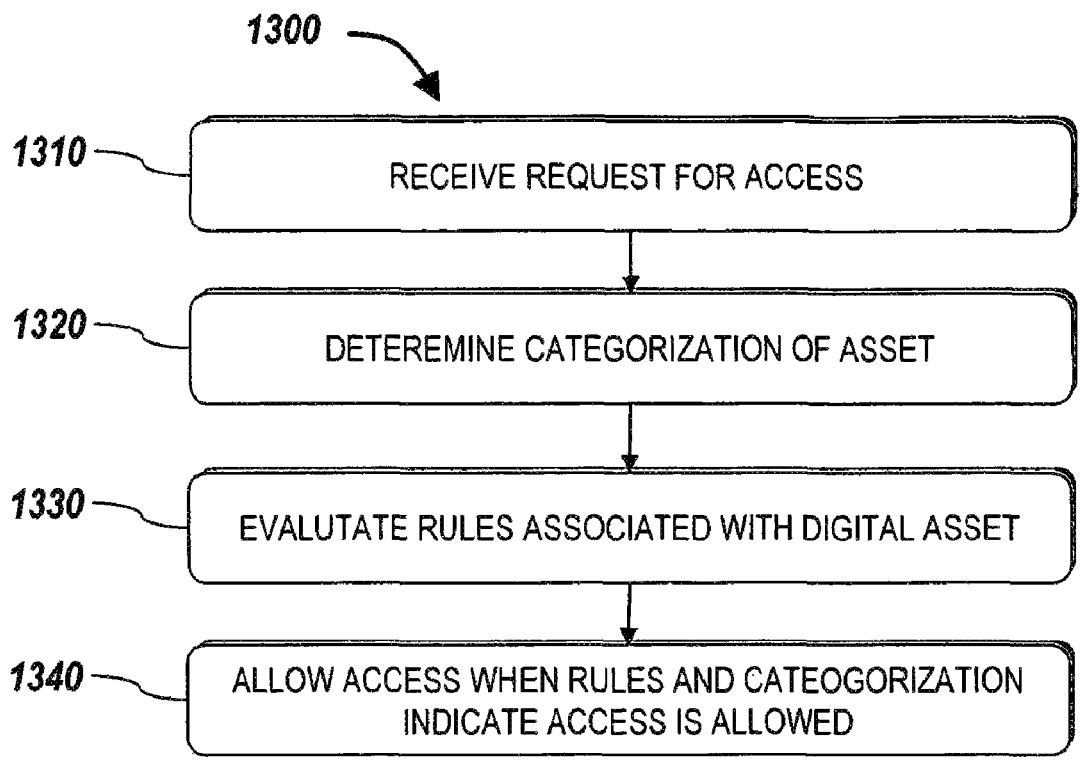
FIG. 13 shows an embodiment of a method of performing categorization based access to a digital asset.

One embodiment of a method of providing meta-data based access to a digital asset is shown and described with reference to FIG. 13. The method includes receiving (step 1310) a request to access the digital asset, determining (step 1320) a categorization of the digital asset, evaluating (step 1330) any rules associated with the categorization, and allowing (step 1340) access to the digital asset when the determining and evaluating indicate access is allowed.

In one embodiment, the receiving (step 1310) includes intercepting, by the filter driver 254 or plug-in 258, a file system access request. The file system access request can include, but is not limited to, a copy request, an open request, a move request, a delete request, and the like.

The filter driver 254 or plug-in 258 analyzes the meta-data associated with the digital asset. The analysis includes, processing the meta-data to determine (step 1320) which taxonomy tags 430 are associated with the digital asset. The analysis also includes evaluating (step 1330) the rules that are associated with the applied taxonomy tags 430. For example, if a digital asset was tagged as Finance/Budget, the associated rules can be to restrict access to only all the executives and John, who is a consultant, when he is accessing the digital asset from a computer located at the offices of the corporation. The filter driver 254 intercepts the file system request for access and ensures that that each of the conditions is satisfied. If each of the conditions is satisfied, the requested access is allowed (step 1340). Although described from the perspective of the client 110, it should be understood the server 150 can also perform the described method.

It is also desirable to prevent unauthorized access to digital assets by trying to circumvent the rules and categorizations associated with the digital assets. To that end, the invention propagates the meta-data with the digital asset. For example, if a digital asset is attached to an email the meta-data is also attached to the email. Similarly, if a digital asset is copied to a storage device, the meta-data associated with the digital asset is copied as well.

Figure 14:
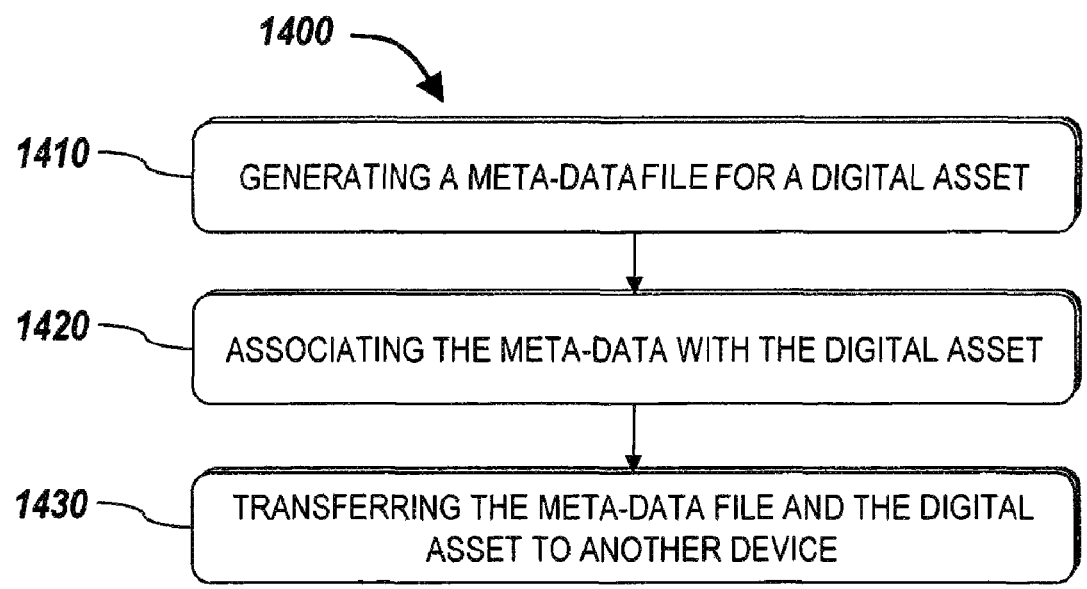
FIG. 14 shows an embodiment of a method of propagating the meta-data with a digital asset.

FIG. 14 depicts an embodiment of a method of propagating the meta-data with a digital asset. The method includes generating (step 1410) a meta-data set for a digital asset, associating (step 1420) the meta-data set with the digital asset, and transferring (step 1430) the meta-data set with the digital asset.

The various methods of generating a meta-data set for a digital asset have been described above and will not be repeated here. The meta-data set can have characteristics of the digital asset. For example, if the digital asset is a word file, the meta-data set can have certain properties of a word file as well. In one embodiment, the meta-data set is a hidden file.

The associated meta-data set is transferred (step 1430) with the digital asset. Transferring can include, but is not limited to, copying, renaming, deleting, moving, emailing, and the like. In the case a digital asset is transferred as an attachment to an email, the meta-data can be transferred using certain aspects of the email. It is known, when an email is transmitted to a recipient the email format is defined by standards from the IETF such as RFC 822 or the newer RFC 2822, the entire contents of which are herein incorporated by reference. These standards provide for fields in the email header such as comments, keywords and an optional-field. The meta-data can be placed into these fields using the plug-in 258 of the client software 212 or by a network filter driver 254 (not shown) that is located in the network driver stack of the client 110. By sending the meta-data with the digital asset, the meta-data is received at the same time as the digital asset.

In certain instances, it is desirable to suspend the creation of meta-data for digital asset. For example, during the installation of other software applications. Typically, when installing software, a program is executing commands that will cause folders to be created. The end-user could be bombarded with requests for categorization for folders. Because of this, there is a special command that can be executed by the end-user of the client 110 that informs the client software 212 to suspend its operation.

Figure 4:
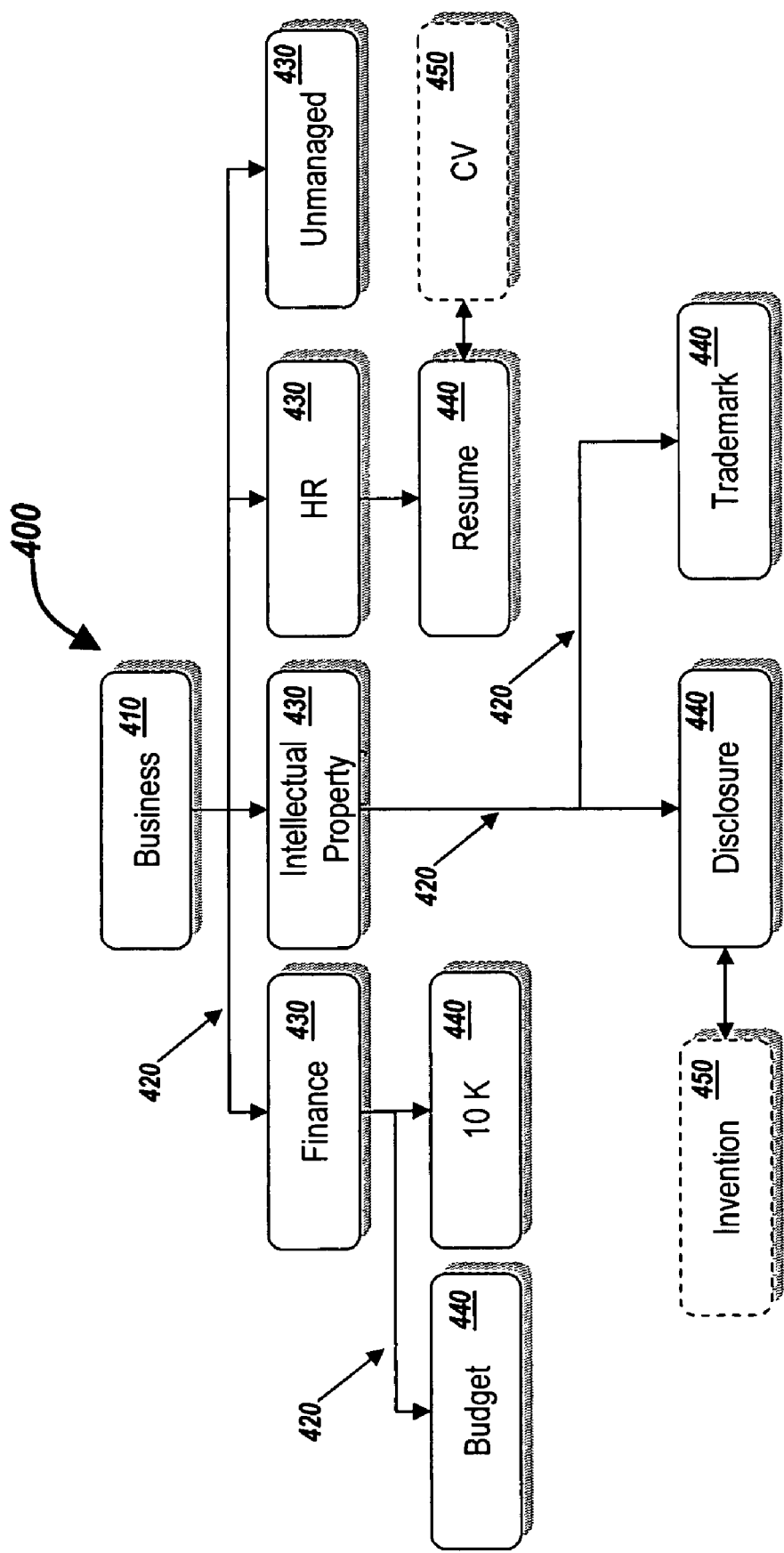
FIG. 4 shows an embodiment of an adaptive taxonomy that incorporates principles of the invention.

Referring back to FIG. 4, the adaptive feature of the adaptive taxonomy is described. One aspect of the invention is the ability of end-users and administrators to create aliases 450 to taxonomy tags 430 to provide an adaptive taxonomy 440. The aliases can be available only the end-user of the client 110 or available globally to all clients 110. Additionally, an alias can be promoted to taxonomy tag 440. The invention also provides a means to set a policy describing which end-users can create aliases 450. As shown in FIG. 4, the alias 450 labeled "INVENTION" refers to the taxonomy tag 440 labeled "DISCLOSURE." Similarly, the alias 450 labeled "CV" is an alias for the taxonomy tag 440 "RESUME." Each alias inherits each of the rules and categorizations of the taxonomy tag 440 to which it refers.

Figure 15:
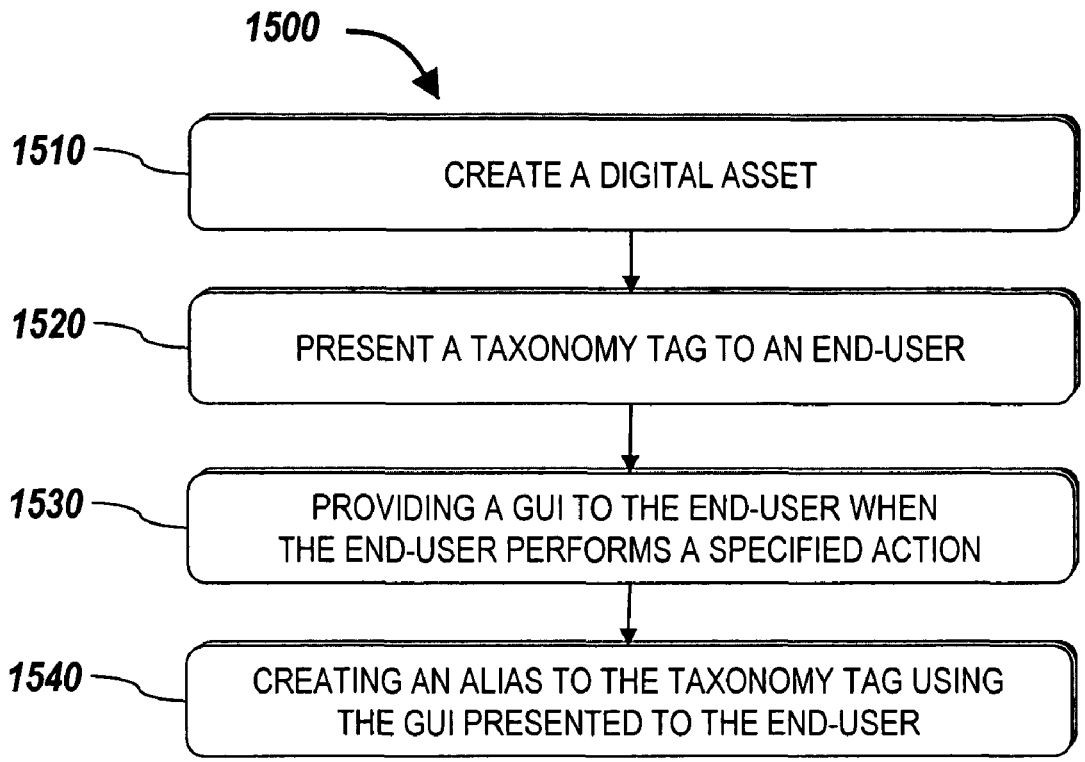
FIG. 15 shows an embodiment of a method of creating an alias to a tag of the adaptive taxonomy of FIG. 4.

With reference to FIG. 15, a method of creating an alias for a taxonomy tag is shown and described. The method includes creating (step 1510) a digital asset, presenting (step 1520) all or a portion of the taxonomy tags 440 to the end-user, providing (step 1530) a graphical user interface to the end-user if the end-user performs a specified action, and creating (step 1540) an alias using the graphical user interface presented to the end-user.

As previously explained the end-user can apply a presented taxonomy tag to a digital asset before the digital asset is saved to the file system of the client 110 or after the digital asset is stored at the client 110. The taxonomy tag 440 categorizes the digital asset and typically includes at least one rule for the digital asset.

The end-user can specifically request the formation of an alias by performing a specified action. The action can be, but is not limited to, selecting a button presented with the taxonomy tags 440 or not selecting one of the presented taxonomy tags. Once the client software 212 determines that the end-user wants to create an alias 450, a graphical user interface is presented to the end-user that allows the end-user to create the alias 450. The end-user supplies a required set of characteristics of the alias. For example, to which taxonomy tag 440 the alias 450 refers and an associated policy. The policy can be the same policy as the taxonomy tag 440 or a more restrictive policy.

The following example is designed to illustrate the adaptive taxonomy features of the invention and is not intended to limit the invention. Referring to FIG. 4, the tag 430 labeled "Resume" that is used to categorize resume information in the HR department. A policy is associated with the Resume tag 440 that implements a first policy "A". After policy A is in place and another end-user of the HR department decides that the department needs a new tag called "CV". The end-user is presented with a graphical user interface that requires the end-user to provide a taxonomy tag 440 to which the alias 450 CV is linked (i.e., Resume), the reason for creating the alias 450, and whether a more restrictive policy "B" should be applied to digital assets tagged with the CV alias 450.

The alias 450 is able to be used by the end-user locally. However, it may be desirable to allow other end-users to use the same alias 450. To the end, the alias 450 is transmitted to the server 150 for review by an administrator.

As previously stated, the server software 312 provides certain features of the invention alone and in combination with the client software 212. Examples of features provided by the server software 312 include, promoting an alias 450 to a tag 430 and modifying the adaptive taxonomy 400, performing unions of meta-data sets for digital assets, and locating digital assets in the distributed computing environment. Each of these features is discussed below in more detail.

An administration reviews the aliases that have been created by the end-users of the client 110 on a periodic basis. Continuing with the above example, if the administrator agrees with the request to make an alias 450 called "CV" the administrator modifies the taxonomy 400 to include the alias 450 CV using the server software 312. As previously mentioned, the alias 450 can have the same policies as the Resume taxonomy tag 440 or a more restrictive policy. The updated taxonomy 400 is transferred to each client 110 the next time the client connects to the server 150.

Alternatively, administrator can deny the alias 450 CV. As a result, the alias 450 CV is only available local to the end-user of the client 110 that created the alias. Said another way, the alias 450 CV is not published to the other clients 110. The end-user can also remove local aliases as needed. As such, the digital asset is then tagged with the taxonomy tag that the alias referred to prior to deletion.

Additionally, the administrator can "promote" an alias 450 to a taxonomy tag 430. In essence, a promotion from an alias 450 to a taxonomy tag 430 has the same effect as adding a new tag 430 to the adaptive taxonomy 400. Continuing with the with above example, if it is later decided that a different policy should be applied to digital assets categorized as a CV versus those categorized as Resumes, the administrator can promote the alias 450 labeled as CV to a taxonomy tag 430 and revise the associated policy for the CV taxonomy tag 430.

It is conceivable that the same digital asset exists on multiple clients 110. Each of the end-users can apply a different taxonomy tag 430 to the digital asset. If the digital asset is a records managed asset, a copy of each of the meta-data sets associated with the digital asset are stored at the server 150. Having different policy information with the same digital asset may allow for circumvention of the desired result of the present invention. To that end, a method of unionizing the meta-data sets for the digital asset is performed by, in one embodiment, the server software 312.

Figure 16:
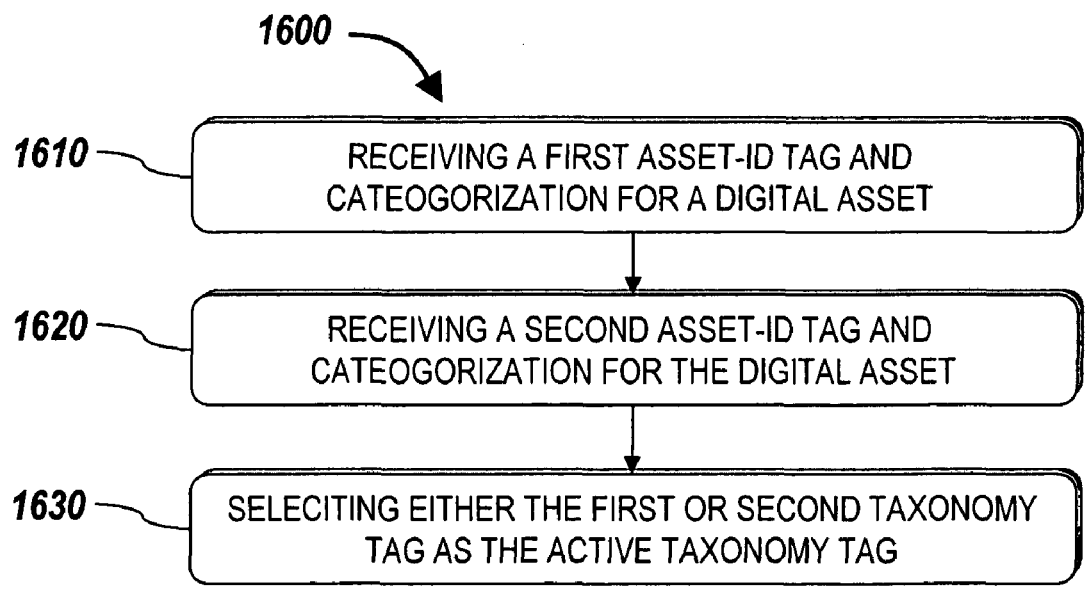
FIG. 16 shows an embodiment of a method of unionizing different meta-data sets for the same digital asset in accordance with principles of the invention.

One embodiment of a method 1600 of unionizing the associated meta-data tags is shown and described with reference to FIG. 16. The method includes receiving (step 1610) a first meta-data set for a digital asset from a first client 110, receiving (step 1620) a second meta-data set for the same digital asset from a second client 110, and selecting (step 1630) one of the categorizations of the digital asset of as the active categorization. Although the other categorizations are present in the meta-data, only the active categorization and its associated policies are enforced with respect to the digital asset.

Various methods are used to determine which categorization to select. In one embodiment, the more restrictive categorization is selected. For example, the categorization that allows the fewest end-uses to access the digital asset is selected. Other examples include selecting the categorization that allows the largest number of end-users access to the digital asset, selecting the categorization that permits the fewest number of actions to be performed on the file, selecting the categorization that allows the largest number of actions to be performed on the file, selecting the categorization having the earliest association date.

In one embodiment, the following method is used to determine which categorization to select. First a comparison between the retention policies is performed and the categorization having the longer retention policy is applied. If the retention polices are equal, then a comparison of the expiration policies is performed. Again, the categorization having the longer expiration policy is applied. If expiration policies are equal, then the end-user is queried to provide a ranking to each policy to resolve the conflict. In one embodiment, the invention includes a policy analysis engine that analyzes the policies when they are created. In the case of competing polices, the end-user is queried to rank the competing policies to the resolution of competing policy as applied to the digital assets occurs automatically.

Each of the categorization remains with the meta-data set for the digital asset. The not active categorization is not removed from the meta-data set. The reason for this is that different groups or end-users within an organization can view the value of a digital asset. For example, the legal department can view an offer letter as a contract, human resources can view the same offer letter as a salary benchmark, and manufacturing can view the offer letter as just a letter. This information is included as part of the audit information of the meta-data set. The below example illustrates certain aspects of the invention.

Once the server software 312 identifies that the meta-data sets are for the same digital asset the process of unionizing the meta-data set for the digital asset is executed. For purposes of this example, assume that an end-user of a first client categorized a digital asset "General Corporate" and another end-user categorizes the same digital asset as "Budget". Both categorizations are correct, but one is more correct. The server software 312 determines which categorization is stricter and selects that categorization as the active categorization.

The server 150 saves the information for each of the meta-data sets in a master meta-data set for the digital asset. The master meta-data set includes the information from each of the meta-data sets. The master meta-data set becomes the meta-data set for the digital asset and is communicated to each client 110 the next time the client establishes a connection with the server 150.

Although described with reference to the server 150, it should be understood that the client 110 is also capable of unionizing the associated meta-files. The functionality is provided and used by the client software 212. For example when a first file and a second file are each copied and pasted into a third file, the client software 212 performs a union of the first files meta-data the second files meta-data to generate a master meta-data set for the third file.

Figure 17:
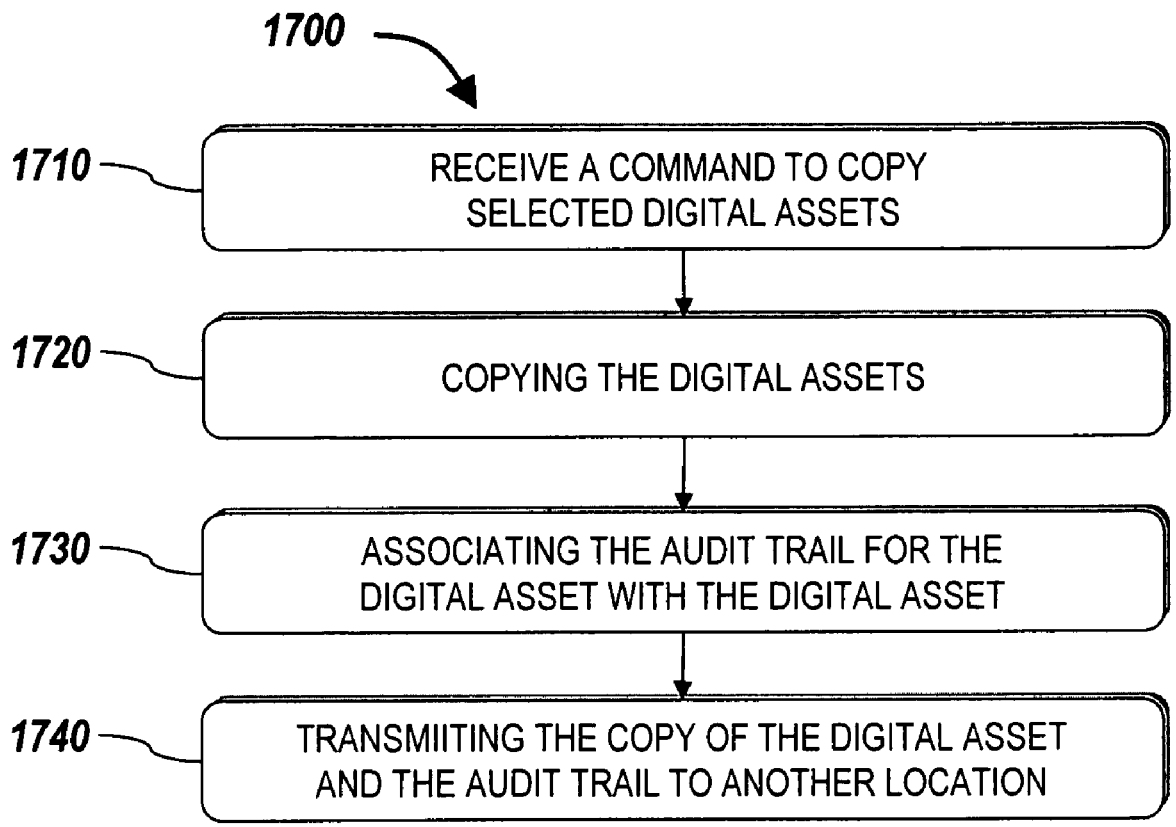
FIG. 17 shows an embodiment of a method of identifying digital assets in the DCE of FIG. 1.

Another feature provided by the invention is the ability to located and freeze the state of digital assets with in the distributed computing environment 100. In one embodiment, this feature is accomplished by the cooperation of the server software 312 and the client software 212. One method of capturing a set of digital assets is shown and described with reference to FIG. 17.

In one embodiment, the method includes receiving (step 1710) by a client 110 an instruction from the server 150 to copy specific digital assets identified by the meta-data for the digital asset, copying (step 1720) the identified digital assets, associating (step 1730) a respective audit trail to each of the respective copied digital asset, and transmitting (step 1740) the digital assets and their associated audit trails to the server 150.

To illustrate some of the features of the invention, the following example is provided. The example illustrates how an administrator of server 150 uses the software system of the invention to select a set of digital assets in the distributed computing environment 100 to be frozen and produced in litigation. The result of this operation is a report of digital assets of interest along with the locations of the information.

Each client 110 periodically checks with server 150 for issued instruction. If an instruction exists, the client 110 receives the instructions. The periodicity can vary and can also be overridden. For example, the end-user of a client 110 can issue a connection request by performing an operation using the client 110. In response to receiving the instructions, the client software 212 analyzes the instructions and begins their execution. In this example, assume the server 150 instructs the client 110 to prevent modification (i.e., freeze) and generate copies of indicated digital assets and their associated meta-data, which includes the audit history of the digital asset. After the server software 312 copies a respective digital asset, that digital asset is released from the hold state so that the end-user of the client can access the digital asset. The client 110 transmits the copy of the digital asset and meta-data to the server 150.

Each client 110 of the distributed computing environment 100 performs the copy operating in parallel with the other clients 110. The server software 312 includes functionality to provide a status report displaying the number or percentage of clients 110 that received the instruction, the number of clients 110 still to receive the instruction, and the number of clients 110 that have completed the copy and transmission operations. It should be understood other progress metrics can be included in the reporting functionality of the invention.

The previously described embodiments may be implemented as a method, apparatus or article of manufacture using programming and/or engineering techniques to produce software, firmware, hardware, or any combination thereof. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.), a file server providing access to the programs via a network transmission line, wireless transmission media, signals propagating through space, radio waves, infrared signals, etc. The article of manufacture includes hardware logic as well as software or programmable code embedded in a computer readable medium that is executed by a processor. Of course, those skilled in the art will recognize that many modifications may be made to this configuration without departing from the scope of the present invention.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method for tracking a number of copies of a digital asset in a distributed computing environment, the distributed computing environment having a central computing device that stores meta-data for at least one digital asset, and the distributed computing environment having one or more client devices that locally store digital assets and meta-data associated with the digital assets, the method comprising:
    (a) receiving at a client device within a distributed computing environment, an instruction to copy an original digital asset, the original digital asset associated with an original meta-data entry;
    (b) determining, responsive to receiving the copy instruction, the client device created a copy of the original digital asset;
    (c) generating, by the client device in response to the determination that the digital asset copy was created, an additional meta-data entry indicating the copy of the original digital asset was created by the client device;
    (d) adding the additional meta-data entry to the original meta-data entry to update the original meta-data entry associated with the original digital asset; and
    (e) associating the original meta-data entry with the original digital asset copy;
    wherein the original digital asset resides in the client device;
    wherein determining that the client device created a copy of the original digital asset includes:
        monitoring a series of file system input/output (I/O) operations occurring in the client device, and
        detecting, among the series of file system I/O operations, a particular file system I/O operation which creates the copy of the original digital asset; and
    wherein generating the additional meta-data entry indicating that the copy of the original digital asset was created by the client device includes:
        creating the additional meta-data entry in response to detection of the particular file system I/O operation which created the copy of the original digital asset, the original meta-data entry and the additional meta-data entry concurrently residing on the client device, the original meta-data entry being associated with the original digital asset, and the additional meta-data entry being associated with the copy of the original digital asset;
    wherein adding the additional meta-data entry to the original meta-data entry includes:
        providing a unionized meta-data entry which is the union of the original meta-data entry and the additional meta-data entry; and
    wherein associating the original meta-data entry with the original digital asset copy includes:
        associating the unionized meta-data entry with the original digital asset in place of the original meta-data entry.

2. The method of claim 1, wherein determining further comprises:
    comparing the original meta-data entry with a known meta-data entry to determine the client device created the digital asset copy tags.

3. The method of claim 1, wherein adding further comprises: adding the additional meta-data entry including characteristics of a copy operation performed to generate the digital asset copy, the characteristics including any combination of either of a date, a time, an indicator of an end-user that created the copy, and an indicator of a source of the digital asset.

4. The method of claim 1, wherein associating further comprises applying categorization information associated with the original digital asset to the digital asset copy.

5. The method of claim 4, wherein the applying comprises performing a union of categorization information when more than one categorization of the original digital asset is present.

6. A system for tracking the number of copies of a digital asset in a distributed computing environment, the distributed computing environment having a central computing device that stores meta-data for at least one digital asset, and the distributed computing environment having one or more client devices that locally store digital assets and meta-data associated with the digital assets, the system comprising:
    (a) a server connected to a network and included within a distributed computing environment and
    (b) a client device in communication with the server and included within the distributed computing environment, the client device:
        receiving an instruction to copy an original digital asset, the original digital asset associated with an original meta-data entry,
        determining, responsive to receiving the copy instruction, a copy of the original digital asset was created,
        generating, in response to the determination that the digital asset copy was created, an additional meta-data entry indicating that a copy of the original digital asset was created by the client device,
        adding the additional meta-data entry to the original meta-data entry to update the original meta-data entry, and
        associating the original meta-data entry with the digital asset copy;
    wherein the original digital asset resides in the client device;
    wherein the client device, when determining that the client device created a copy of the original digital asset, is constructed and arranged to:
        monitor a series of file system input/output (I/O) operations occurring in the client device, and
        detect, among the series of file system I/O operations, a particular file system I/O operation which creates the copy of the original digital asset; and
    wherein the client device, when generating the additional meta-data entry indicating that the copy of the original digital asset was created by the client device, is constructed and arranged to:
        create the additional meta-data entry in response to detection of the particular file system I/O operation which created the copy of the original digital asset, the original meta-data entry and the additional meta-data entry concurrently residing on the client device, the original meta-data entry being associated with the original digital asset, and the additional meta-data entry being associated with the copy of the original digital asset;

wherein the client device, when adding the additional meta-data entry to the original meta-data entry, is constructed and arranged to:
provide a unionized meta-data entry which is the union of the original meta-data entry and the additional meta-data entry; and
wherein the client device, when associating the original meta-data entry with the original digital asset copy, is constructed and arranged to:
associate the unionized meta-data entry with the original digital asset in place of the original meta-data entry.

7. The system of claim 6, wherein the client device further comprises a comparator for comparing the original meta-data entry with a known meta-data entry to determine a copy of the digital asset created tags.

8. The system of claim 6, wherein the client device generates an additional a meta-data entry indicating that a printed copy of the original digital asset was created.

9. The system of claim 6, wherein the client device applies categorization information associated with the original digital asset to the digital asset copy.

10. The system of claim 9, wherein the client device performs a union of categorization information when more than one categorization of the original digital asset is present.

11. A computer readable medium having instructions executable by a processor to track the number of copies of a digital asset in a distributed computing environment, the distributed computing environment having a central computing device that stores meta-data for at least one digital asset, and the distributed computing environment having one or more client devices that locally store digital assets and meta-data associated with the digital assets, the computer readable medium comprising:
instructions to receive, by a client device within a distributed computing environment, an instruction to copy an original digital asset, the original digital asset associated with an original meta-data entry;
instructions to determine, responsive to receiving the copy instruction, the client device created a copy of the original digital asset;
instructions to generate, by the client device in response to the determination that the digital asset copy was created, an additional meta-data entry indicating that a copy of the original digital asset was created by the client device;
instructions to add the additional meta-data entry to the original meta-data entry to update the original meta-data entry associated with the original digital asset; and
instructions to associate the original meta-data entry with the digital asset copy;
wherein the original digital asset resides in the client device;
wherein the instructions to determine that the client device created a copy of the original digital asset include:
instructions to monitor a series of file system input/output (I/O) operations occurring in the client device, and
instructions to detect, among the series of file system I/O operations, a particular file system I/O operation which creates the copy of the original digital asset; and
wherein the instructions to generate the additional meta-data entry indicating that the copy of the original digital asset was created by the client device include:
instructions to create the additional meta-data entry in response to detection of the particular file system I/O operation which created the copy of the original digital asset, the original meta-data entry and the additional meta-data entry concurrently residing on the client device, the original meta-data entry being associated with the original digital asset, and the additional meta-data entry being associated with the copy of the original digital asset;
wherein the instructions to add the additional meta-data entry to the original meta-data entry include:
instructions to provide a unionized meta-data entry which is the union of the original meta-data entry and the additional meta-data entry; and
wherein the instructions to associate the original meta-data entry with the original digital asset copy include:
instructions to associate the unionized meta-data entry with the original digital asset in place of the original meta-data entry.

12. The computer readable medium of claim 11, wherein the instructions to determine comprise instructions to compare an asset identification tag created for the digital asset copy with a set of known asset identification tags.

13. The computer readable medium of claim 11, wherein the instructions to generate comprise instructions to generate an additional meta-data entry indicating that a printed copy of the original digital asset was created.

14. The computer readable medium of claim 11, further comprising instructions to apply categorization information associated with the original digital asset to the digital asset copy.

15. The computer readable medium of claim 14, wherein the instructions to apply comprise instructions to perform a union of categorization information when more than one categorization of the original digital asset is present.

16. The method of claim 1 wherein associating the unionized meta-data entry with the original digital asset in place of the original meta-data entry occurs within the client device; and wherein the method further comprises:
transmitting the unionized meta-data entry, which is associated with the original digital asset in place of the original meta-data entry, to a server device which centrally stores meta-data entries for distribution to other client devices of the distributed computing environment.

17. The method of claim 1, further comprising:
copying the original digital asset to form a copy of the original digital asset which exists concurrently with the original digital asset, at least one of the original digital asset and the copy of the original digital asset being an electronic file which is editable by a user of the client device.

18. The method of claim 1 wherein associating the unionized meta-data entry with the original digital asset in place of the original meta-data entry includes:
deleting, by the client device, the original meta-data entry associated with the original digital asset, and
relating, by the client device, the unionized meta-data entry to the original digital asset in place of the deleted original meta-data entry prior to transmitting the unionized meta-data entry from the client device to a server device which centrally stores meta-data entries for distribution to other client devices of the distributed computing environment.

19. A method for tracking a digital asset within a distributed computing environment having a central computing device and multiple client devices, an original meta-data entry initially residing on the central computing device and identifying characteristics of the digital asset, the method comprising:
receiving a first copy instruction at a first client device;

in response to the first copy instruction and using the first client device, creating a first copy of the digital asset on the first client device, and generating a first copy meta-data entry on the first client device, the first copy meta-data entry identifying characteristics of the first copy of the digital asset created on the first client device to enable tracking of the first copy of the digital asset created on the first client device;

using the first client device, performing a first meta-data unionizing operation which unionizes the original meta-data entry and the first copy meta-data entry into a first unionized meta-data entry on the first client device to enable concurrent tracking of the digital asset and the first copy of the digital asset created on the first client device;

using the central computing device, receiving the first unionized meta-data entry from the first client device and replacing the original meta-data entry which initially resided on the central computing device with the first unionized meta-data entry from the first client device;

receiving a second copy instruction at a second client device;

in response to the second copy instruction and using the second client device, creating a second copy of the digital asset on the second client device, and generating a second copy meta-data entry on the second client device, the second copy meta-data entry identifying characteristics of the second copy of the digital asset created on the second client device to enable tracking of the second copy of the digital asset created on the second client device;

using the second client device, performing a second meta-data unionizing operation which unionizes the first unionized meta-data entry and the second copy meta-data entry into a second unionized meta-data entry on the second client device to enable concurrent tracking of the digital asset, the first copy of the digital asset created on the first client device, and the second copy of the digital asset created on the second client device; and using the central computing device, receiving the second unionized meta-data entry from the second client device and replacing the first unionized meta-data entry which subsequently resided on the central computing device with the second unionized meta-data entry.

* * * * *